(12) United States Patent
Chae et al.

(10) Patent No.: US 11,767,250 B2
(45) Date of Patent: Sep. 26, 2023

(54) SYSTEMS AND METHODS FOR VACUUM-FORMING ASPHERIC MIRRORS

(71) Applicant: CORNING INCORPORATED, Corning, NY (US)

(72) Inventors: Kyubong Chae, Suwon-si (KR); Hong-keun Jee, Asan-si (KR); BongChul Kim, Asan-si (KR); Jonghwa Kim, Cheonan-si (KR); Taemun Kim, Asan-si (KR); Myoung-se Lee, Cheonan-si (KR)

(73) Assignee: Corning Incorporated, Corning, NY (US)

( * ) Notice: Subject to any disclaimer, the term of this patent is extended or adjusted under 35 U.S.C. 154(b) by 563 days.

(21) Appl. No.: 16/768,378

(22) PCT Filed: Nov. 30, 2018

(86) PCT No.: PCT/KR2018/015092
§ 371 (c)(1),
(2) Date: May 29, 2020

(87) PCT Pub. No.: WO2019/108016
PCT Pub. Date: Jun. 6, 2019

(65) Prior Publication Data
US 2020/0385301 A1    Dec. 10, 2020

Related U.S. Application Data

(60) Provisional application No. 62/592,570, filed on Nov. 30, 2017.

(51) Int. Cl.
*C03B 23/03* (2006.01)
*C03B 23/035* (2006.01)
(Continued)

(52) U.S. Cl.
CPC .......... *C03B 23/0357* (2013.01); *B60K 35/00* (2013.01); *G02B 5/10* (2013.01);
(Continued)

(58) Field of Classification Search
CPC ........................... C03B 23/093; C03B 23/098
See application file for complete search history.

(56) References Cited

U.S. PATENT DOCUMENTS 2,068,030 A     1/1937  Lieser
2,352,957 A *   7/1944  Kell .................... C03B 23/0357
                                                        65/106
(Continued)

FOREIGN PATENT DOCUMENTS

CN     1587132 A     3/2005
CN     1860081 A    11/2006
(Continued)

OTHER PUBLICATIONS

Author Unknown; "Stress Optics Laboratory Practice Guide" 2012; 11 Pages.
(Continued)

*Primary Examiner* — Jodi C Franklin

(57) ABSTRACT

A method of forming a 3D mirror for a heads-up display (HUD) system includes providing a glass-based preform having a first major surface, a second major surface, and a minor surface connecting the first and second major surfaces, and further includes disposing the glass-based preform on a mold having a concave surface such that the first and second longitudinal side surfaces are adjacent to a longitudinal wall of a housing. The longitudinal wall extends from the concave surface to at least a height of the second major surface of the glass-based preform. The method further includes supplying a vacuum and conforming the second major surface to the concave surface of the mold
(Continued)

using the vacuum. The first and second transverse side surfaces have a curved shape corresponding to a curve of the concave surface a remain coincident with the concave surface during the conforming of the second major surface.

16 Claims, 17 Drawing Sheets

(51) Int. Cl.
   *B60K 35/00* (2006.01)
   *G02B 5/10* (2006.01)
   *G02B 27/01* (2006.01)

(52) U.S. Cl.
   CPC .. *G02B 27/0101* (2013.01); *B60K 2370/1529* (2019.05); *B60K 2370/81* (2019.05); *C03B 2225/02* (2013.01); *G02B 2027/013* (2013.01)

(56) References Cited

U.S. PATENT DOCUMENTS

| | | | |
|---|---|---|---|
| 2,608,030 A | 8/1952 | Jendrisak | |
| 3,197,903 A | 8/1965 | Walley | |
| 3,338,696 A | 8/1967 | Dockerty | |
| 3,582,456 A | 6/1971 | Stolki | |
| 3,682,609 A | 8/1972 | Dockerty | |
| 3,737,212 A * | 6/1973 | Antonson | G02B 5/32 |
| | | | 359/14 |
| 3,753,840 A | 8/1973 | Plumat | |
| 3,778,335 A | 12/1973 | Boyd | |
| 3,790,430 A | 2/1974 | Mochel | |
| 3,799,817 A | 3/1974 | Laethem | |
| 4,147,527 A | 4/1979 | Bystrov et al. | |
| 4,238,265 A | 12/1980 | Deminet | |
| 4,445,953 A | 5/1984 | Hawk | |
| 4,455,338 A | 6/1984 | Henne | |
| 4,470,837 A * | 9/1984 | Seymour | C03B 23/0256 |
| | | | 65/351 |
| 4,746,348 A * | 5/1988 | Frank | C03B 27/0445 |
| | | | 65/273 |
| 4,802,903 A | 2/1989 | Kuster et al. | |
| 4,859,636 A | 8/1989 | Aratani et al. | |
| 4,899,507 A | 2/1990 | Mairlot | |
| 4,969,966 A | 11/1990 | Norman | |
| 4,985,099 A | 1/1991 | Mertens et al. | |
| 5,108,480 A | 4/1992 | Sugiyama | |
| 5,154,117 A | 10/1992 | Didelot et al. | |
| 5,173,102 A | 12/1992 | Weber et al. | |
| 5,245,468 A | 9/1993 | Demiryont et al. | |
| 5,250,146 A | 10/1993 | Horvath | |
| 5,264,058 A | 11/1993 | Hoagland et al. | |
| 5,300,184 A | 4/1994 | Masunaga | |
| 5,711,119 A | 1/1998 | Cornils et al. | |
| 5,713,976 A * | 2/1998 | Kuster | C03B 23/0357 |
| | | | 65/273 |
| 5,897,937 A | 4/1999 | Cornils et al. | |
| 6,044,662 A | 4/2000 | Morin | |
| 6,086,983 A * | 7/2000 | Yoshizawa | B32B 17/10761 |
| | | | 428/436 |
| 6,101,748 A | 8/2000 | Cass et al. | |
| 6,170,956 B1 * | 1/2001 | Rumsey | B60R 1/088 |
| | | | 359/603 |
| 6,242,931 B1 | 6/2001 | Hembree et al. | |
| 6,265,054 B1 | 7/2001 | Bravet et al. | |
| 6,270,605 B1 | 8/2001 | Doerfler | |
| 6,274,219 B1 | 8/2001 | Schuster et al. | |
| 6,287,674 B1 | 9/2001 | Verlinden et al. | |
| 6,302,985 B1 | 10/2001 | Takahashi et al. | |
| 6,332,690 B1 * | 12/2001 | Murofushi | G02F 1/133305 |
| | | | 349/64 |
| 6,387,515 B1 | 5/2002 | Joret et al. | |
| 6,420,800 B1 | 7/2002 | Levesque et al. | |
| 6,426,138 B1 | 7/2002 | Narushima et al. | |
| 6,582,799 B1 * | 6/2003 | Brown | B32B 17/10036 |
| | | | 428/34 |
| 6,620,365 B1 | 9/2003 | Odoi et al. | |
| 6,816,225 B2 | 11/2004 | Colgan et al. | |
| 6,903,871 B2 | 6/2005 | Page | |
| 7,297,040 B2 | 11/2007 | Chang et al. | |
| 7,375,782 B2 | 5/2008 | Yamazaki et al. | |
| 7,478,930 B2 | 1/2009 | Choi | |
| 7,489,303 B1 | 2/2009 | Pryor | |
| 7,542,302 B1 | 6/2009 | Curnalia et al. | |
| 7,750,821 B1 | 7/2010 | Taborisskiy et al. | |
| 7,955,470 B2 | 6/2011 | Kapp et al. | |
| 8,298,431 B2 | 10/2012 | Chwu et al. | |
| 8,344,369 B2 | 1/2013 | Yamazaki et al. | |
| 8,521,955 B2 | 8/2013 | Arulambalam et al. | |
| 8,549,885 B2 * | 10/2013 | Dannoux | C03B 23/023 |
| | | | 65/273 |
| 8,586,492 B2 | 11/2013 | Barefoot et al. | |
| 8,652,978 B2 | 2/2014 | Dejneka et al. | |
| 8,692,787 B2 | 4/2014 | Imazeki | |
| 8,702,253 B2 | 4/2014 | Lu et al. | |
| 8,765,262 B2 | 7/2014 | Gross | |
| 8,814,372 B2 | 8/2014 | Vandal et al. | |
| 8,833,106 B2 | 9/2014 | Dannoux et al. | |
| 8,912,447 B2 | 12/2014 | Leong et al. | |
| 8,923,693 B2 | 12/2014 | Yeates | |
| 8,962,084 B2 | 2/2015 | Brackley et al. | |
| 8,967,834 B2 | 3/2015 | Timmerman et al. | |
| 8,969,226 B2 | 3/2015 | Dejneka et al. | |
| 8,978,418 B2 | 3/2015 | Balduin et al. | |
| 9,007,226 B2 | 4/2015 | Chang | |
| 9,061,934 B2 | 6/2015 | Bisson et al. | |
| 9,090,501 B2 | 7/2015 | Okahata et al. | |
| 9,109,881 B2 | 8/2015 | Roussev et al. | |
| 9,140,543 B1 | 9/2015 | Allan et al. | |
| 9,156,724 B2 | 10/2015 | Gross | |
| 9,223,162 B2 | 12/2015 | Deforest et al. | |
| 9,240,437 B2 | 1/2016 | Shieh et al. | |
| 9,278,500 B2 | 3/2016 | Filipp | |
| 9,278,655 B2 | 3/2016 | Jones et al. | |
| 9,290,413 B2 | 3/2016 | Dejneka et al. | |
| 9,346,703 B2 | 5/2016 | Bookbinder et al. | |
| 9,346,706 B2 | 5/2016 | Bazemore et al. | |
| 9,357,638 B2 | 5/2016 | Lee et al. | |
| 9,442,028 B2 | 9/2016 | Roussev et al. | |
| 9,446,723 B2 | 9/2016 | Stepanski | |
| 9,469,561 B2 | 10/2016 | Kladias et al. | |
| 9,517,967 B2 | 12/2016 | Dejneka et al. | |
| 9,573,843 B2 | 2/2017 | Keegan et al. | |
| 9,593,042 B2 | 3/2017 | Hu et al. | |
| 9,595,960 B2 | 3/2017 | Wilford | |
| 9,606,625 B2 | 3/2017 | Levesque et al. | |
| 9,617,180 B2 | 4/2017 | Bookbinder et al. | |
| 9,663,396 B2 | 5/2017 | Miyasaka et al. | |
| 9,694,570 B2 | 7/2017 | Levasseur et al. | |
| 9,700,985 B2 | 7/2017 | Kashima et al. | |
| 9,701,564 B2 | 7/2017 | Bookbinder et al. | |
| 9,720,450 B2 | 8/2017 | Choi et al. | |
| 9,724,727 B2 | 8/2017 | Domey et al. | |
| 9,802,485 B2 | 10/2017 | Masuda et al. | |
| 9,815,730 B2 | 11/2017 | Marjanovic et al. | |
| 9,821,509 B2 | 11/2017 | Kastell | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 9,933,820 B2 | 4/2018 | Helot et al. | |
| 9,947,882 B2 | 4/2018 | Zhang et al. | |
| 9,955,602 B2 * | 4/2018 | Wildner | H05K 5/0217 |
| 9,957,190 B2 | 5/2018 | Finkeldey et al. | |
| 9,963,374 B2 | 5/2018 | Jouanno et al. | |
| 9,972,645 B2 | 5/2018 | Kim | |
| 9,975,801 B2 | 5/2018 | Maschmeyer et al. | |
| 9,992,888 B2 | 6/2018 | Moon et al. | |
| 10,005,246 B2 | 6/2018 | Stepanski | |
| 10,017,033 B2 | 7/2018 | Fisher et al. | |
| 10,042,391 B2 | 8/2018 | Yun et al. | |
| 10,074,824 B2 | 9/2018 | Han et al. | |
| 10,086,762 B2 | 10/2018 | Uhm | |
| 10,131,118 B2 | 11/2018 | Kang et al. | |

(56) References Cited

U.S. PATENT DOCUMENTS

| | | |
|---|---|---|
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |
| 10,222,825 B2 | 3/2019 | Wang et al. |
| 10,246,364 B2 * | 4/2019 | Nitschke ............ C03B 23/0302 |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,788,707 B2 | 9/2020 | Al et al. |
| 10,976,607 B2 | 4/2021 | Huang et al. |
| 10,995,028 B2 * | 5/2021 | Mannheim Astete ....................... C03B 23/0252 |
| 11,377,383 B2 * | 7/2022 | Frebourg ............. C03B 23/0357 |
| 2002/0039229 A1 | 4/2002 | Hirose et al. |
| 2004/0020244 A1 * | 2/2004 | Kramer ............... C03B 23/0355 65/273 |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2006/0277947 A1 * | 12/2006 | Funk .................. C03B 35/24 65/182.2 |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 * | 1/2010 | Ukrainczyk ........ C03B 23/0307 65/107 |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2011/0051252 A1 * | 3/2011 | Poulsen ............... G02B 3/0062 359/624 |
| 2011/0057465 A1 | 3/2011 | Beau et al. |
| 2011/0148267 A1 | 6/2011 | Mcdaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 * | 6/2012 | Liu .................... C03B 23/0357 65/106 |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 * | 4/2013 | Liu ........................ C03B 40/00 65/106 |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0011000 A1 * | 1/2014 | Dunkmann .............. B60J 1/008 65/106 |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 * | 6/2014 | Jenkins .................... G02B 6/10 425/174.8 E |
| 2014/0168153 A1 | 6/2014 | Deichmann et al. |
| 2014/0168546 A1 | 6/2014 | Magnusson et al. |
| 2014/0234581 A1 * | 8/2014 | Immerman ......... C03B 23/0235 65/273 |
| 2014/0290309 A1 * | 10/2014 | Chang ................. C03B 23/0352 65/106 |
| 2014/0308464 A1 | 10/2014 | Levasseur et al. |
| 2014/0312518 A1 | 10/2014 | Levasseur et al. |
| 2014/0331716 A1 * | 11/2014 | Ahmed .................... H05K 5/03 703/1 |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0175468 A1 * | 6/2015 | Sheehan ............. C03B 23/0235 65/268 |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Segi et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0207818 A1 * | 7/2016 | Lee ....................... B29C 51/428 |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0266383 A1 * | 9/2016 | Liu ..................... G02B 27/0101 |
| 2016/0272529 A1 | 9/2016 | Hong et al. |
| 2016/0280576 A1 * | 9/2016 | Hong ................. C03B 23/0357 |
| 2016/0297176 A1 | 10/2016 | Rickerl |
| 2016/0306451 A1 | 10/2016 | Isoda et al. |

(56) References Cited

U.S. PATENT DOCUMENTS

| | | |
|---|---|---|
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2016/0376184 A1* | 12/2016 | Atkins-Barratt ...... B29C 51/262 65/102 |
| 2017/0008377 A1 | 1/2017 | Fisher et al. |
| 2017/0021661 A1 | 1/2017 | Pelucchi |
| 2017/0059749 A1* | 3/2017 | Wakatsuki ............. C03B 23/02 |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0121210 A1* | 5/2017 | Rai ...................... C03B 23/0352 |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | Mcfarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1* | 11/2017 | Fujii ...................... C03B 23/035 |
| 2017/0334770 A1 | 11/2017 | Luzzato et al. |
| 2017/0349473 A1* | 12/2017 | Moriya ............... C03B 23/0252 |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1* | 5/2018 | Hélot ...................... B60K 35/00 |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0237327 A1* | 8/2018 | Chae .................. C03B 23/0357 |
| 2018/0245125 A1 | 8/2018 | Tsai et al. |
| 2018/0273422 A1* | 9/2018 | Hori ........................ C03C 15/00 |
| 2018/0292650 A1* | 10/2018 | Sato .................... G02B 27/0101 |
| 2018/0304825 A1 | 10/2018 | Mattelet et al. |
| 2018/0324964 A1 | 11/2018 | Yoo et al. |
| 2018/0327301 A1* | 11/2018 | Fujii .................... C03B 23/0258 |
| 2018/0345644 A1 | 12/2018 | Kang et al. |
| 2018/0364760 A1* | 12/2018 | Ahn ....................... G06F 1/1652 |
| 2018/0374906 A1 | 12/2018 | Everaerts et al. |
| 2019/0012032 A1* | 1/2019 | Brandao Salgado ........................ B32B 17/10036 |
| 2019/0034017 A1 | 1/2019 | Boggs et al. |
| 2019/0039352 A1 | 2/2019 | Zhao |
| 2019/0039935 A1 | 2/2019 | Couillard et al. |
| 2019/0069451 A1 | 2/2019 | Myers et al. |
| 2019/0077337 A1* | 3/2019 | Gervelmeyer .... B32B 17/10018 |
| 2019/0152831 A1 | 5/2019 | An et al. |
| 2019/0223309 A1 | 7/2019 | Amin et al. |
| 2019/0256398 A1* | 8/2019 | Palmantier ............ C03B 35/202 |
| 2019/0263706 A1* | 8/2019 | Atkins-Barratt ...... C03B 23/037 |
| 2019/0263713 A1* | 8/2019 | Murayama .......... C03B 23/0302 |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0278541 A1* | 9/2020 | Kim .................... C03B 23/0357 |
| 2020/0301192 A1 | 9/2020 | Huang et al. |
| 2020/0333594 A1* | 10/2020 | Chae .................... C03B 23/0357 |
| 2020/0346969 A1* | 11/2020 | Li .......................... C03C 21/002 |
| 2020/0385301 A1* | 12/2020 | Chae .................... C03B 23/0357 |
| 2021/0003672 A1* | 1/2021 | Yokogawa ............. G02B 5/208 |
| 2021/0055599 A1 | 2/2021 | Chen et al. |
| 2021/0074690 A1* | 3/2021 | Lee ..................... C03B 23/0357 |
| 2021/0101820 A1* | 4/2021 | Frebourg ............ C03B 23/0357 |
| 2021/0116706 A1* | 4/2021 | Aoki ......................... G02B 5/18 |
| 2021/0284565 A1* | 9/2021 | Thellier ................ C03B 35/202 |
| 2021/0395130 A1* | 12/2021 | Yu ......................... G01C 19/661 |
| 2021/0396997 A1* | 12/2021 | Kim ..................... C03C 21/002 |
| 2022/0024798 A1* | 1/2022 | Galgalikar ............. C03C 27/00 |
| 2022/0184909 A1* | 6/2022 | Lutz ................. B29D 11/00326 |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 203825589 U | 9/2014 |
| CN | 204111583 U | 1/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0241355 A1 | 10/1987 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |

(56) References Cited

FOREIGN PATENT DOCUMENTS

| | | |
|---|---|---|
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3315467 A2 | 5/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| FR | 3059318 A1 * | 6/2018 ............ C03B 23/03 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 03-059337 U | 6/1991 |
| JP | 3059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-517380 A | 6/2016 |
| JP | 2016-130810 A | 7/2016 |
| JP | 2016-144008 A | 8/2016 |
| JP | 5976561 B2 | 8/2016 |
| JP | 2016-173794 A | 9/2016 |
| JP | 2016-530204 A | 9/2016 |
| JP | 2016-203609 A | 12/2016 |
| JP | 2016-207200 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2016/208967 A2 | 12/2016 |
| WO | WO-2016208967 A2 * | 12/2016 ........... C03B 23/035 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |

(56) References Cited

FOREIGN PATENT DOCUMENTS

| | | |
|---|---|---|
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

Belis et al; "Cold Bending of Laminated Glass Panels"; Heron vol. 52 (2007) No. 1/2; 24 Pages.

Doyle et al; "Manual on Experimental Stress Analysis"; Fifth Edition, Society for Experimental Mechanics; Unknown Year; 31 Pages.

Elziere; "Laminated Glass: Dynamic Rupture of Adhesion"; Polymers; Universite Pierre Et Marie Curie—Paris VI, 2016. English; 181 Pages.

Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.

Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.

Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.

Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.

Fildhuth; "Design and Monitoring of Cold Bent Lamination—Stabilised Glass"; ITKE 39 (2015) 270 Pages.

Galuppi et al; "Cold-Lamination-Bending of Glass: Sinusoidal is Better Than Circular", Composites Part B 79 (2015) 285-300.

Galuppi et al; "Optical Cold Bending of Laminated Glass"; Internaitonal Journal of Solids and Structures, 67-68 (2015) pp. 231-243.

Millard; "Bending Glass in the Parametric Age"; Enclos; (2015); pp. 1-6; http://www.enclos.com/site-info/news/bending-glass-in-the-parametric-age.

Neugebauer et al; "Let Thin Glass in the FAADE Move Thin Glass—New Possibilities for Glass in the FAADE", Conference Paper Jun. 2018; 12 Pages.

Vakar et al; "Cold Bendable, Laminated Glass—New Possibilities in Design"; Structural Engineering International, Feb. 2004 pp. 95-97.

Weijde; "Graduation Plan"; Jan. 2017; 30 Pages.

Werner; "Display Materials and Processes," Information Display; May 2015; 8 Pages.

International Search Report and Written Opinion of the International Searching Authority; PCT/KR2018/015092; dated Mar. 8, 2019; 13 Pages; Korean Intellectual Property Office.

European Patent Application No. 18883767.8, Extended European Search Report dated Jul. 5, 2021; 8 pages European Patent Office.

"Stainless Steel—Grade 410 (UNS S41000)", available online at <https://www.azom.com/article.aspx?ArticleID=970>, Oct. 23, 2001, 5 pages.

"Standard Test Method for Measurement of Glass Stress—Optical Coefficient", ASTM International, Designation: C770-16, 2016.

Ashley Klamer, "Dead front overlays", Marking Systems, Inc., Jul. 8, 2013, 2 pages.

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.

ASTM C1422/C1422M-10 "Standard Specification for Chemically Strengthened Flat Glass"; Downloaded Jan. 24, 2018; 5 pages.

ASTM Standard C770-98 (2013), "Standard Test Method for Measurement of Glass Stress-Optical Coefficient".

Burchardt et al., (Editorial Team), Elastic Bonding: The basic principles of adhesive technology and a guide to its cost-effective use in industry, 2006, 71 pages.

Byun et al; "A Novel Route for Thinning of LCD Glass Substrates"; SID 06 DIGEST; pp. 1786-1788, v37, 2006.

Datsiou et al., "Behaviour of cold bent glass plates during the shaping process", Engineered Transparency International Conference atglasstec, Dusseldorf, Germany, Oct. 21 and 22, 2014, 9 pages.

Engineering ToolBox, "Coefficients of Linear Thermal Expansion", available online at <https://www.engineeringtoolbox.com/linear-expansion-coefficients-d_95.html>, 2003, 9 pages.

Fauercia "Intuitive HMI for a Smart Life on Board" (2018); 8 Pages http://www.faurecia.com/en/innovation/smart-life-board/intuitive-HMI.

Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].

Ferwerda et al., "Perception of sparkle in anti-glare display screens", Journal of the SID, vol. 22, Issue 2, 2014, pp. 129-136.

Galuppi et al; "Buckling Phenomena in Double Curved Cold-Bent Glass;" Intl. J. Non-Linear Mechanics 64 (2014) pp. 70-84.

Galuppi et al; "Large Deformations and Snap-Through Instability of Cold-Bent Glass" Challenging Glass 4 & Cost Action TU0905 Final Conference; (2014) pp. 681-689.

Galuppi L et al: "Optimal cold bending of laminated glass", Jan. 1, 2007 vol. 52, No. 1/2 Jan. 1, 2007 (Jan. 1, 2007), pp. 123-146.

Gollier et al., "Display Sparkle Measurement and Human Response", SID Symposium Digest of Technical Papers, vol. 44, Issue 1, 2013, pp. 295-297.

Indian Patent Application No. 201917031293 Office Action dated May 24, 2021; 6 pages; Indian Patent Office.

Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).

Li et al., "Effective Surface Treatment on the Cover Glass for Autointerior Applications", SID Symposium Digest of Technical Papers, vol. 47, 2016, pp. 467-469.

Pambianchi et al; "Corning Incorporated: Designing a New Future With Glass and Optics"; Chapter 1 In "Materials Research for Manufacturing: an Industrial Perspective of Turning Materials Into New Products"; Springer Series Material Science 224, p. 12 (2016).

Pegatron Corp. "Pegaton Navigate the Future"; Ecockpit/Center Cnsole Work Premiere; Automotive World; Downloaded Jul. 12, 2017; 2 Pages.

Photodon, "Screen Protectors for Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).

Product Information Sheet: Corning® Gorilla® Glass 3 with Native Damage Resistance™, Corning Incorporated, 2015, Rev: F_090315, 2 pages.

Scholze, H., "Glass-Water Interactions", Journal of Non-Crystalline Solids vol. 102, Issues 1-3, Jun. 1, 1988, pp. 1-10.

Stattler; "New Wave—Curved Glass Shapes Design"; Glass Magazine; (2013); 2 Pages.

(56) References Cited

OTHER PUBLICATIONS

Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).

Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.

Zhixin Wang, Polydimethylsiloxane mechanical properties measured by macroscopic compression and nanoindentation techniques, Graduate Theses and Dissertations, University of South Florida, 2011, 79 pages.

* cited by examiner

Ra ≠ Rb ≠ Rc ≠ Rd

SYSTEMS AND METHODS FOR VACUUM-FORMING ASPHERIC MIRRORS

CROSS-REFERENCE TO RELATED APPLICATIONS

This application is a 371 of PCT Application No.: PCT/KR2018/015092 filed on Nov. 30, 2018, which claims the benefit of priority under 35 U.S.C. § 119 of U.S. Provisional Application Ser. No. 62/592,570 filed on Nov. 30, 2017, the content of which is relied upon and incorporated herein by reference in its entirety

TECHNICAL FIELD

Background Art

Head-Up Display or Heads-Up Display (HUD) systems project visual information onto a transparent surface so that users can see the information without diverting their gaze away from their primary view. HUD systems typically use a mirror to reflect and project an image onto the transparent surface. One application for HUD systems is in transportation, such as automobiles, aircraft, marine craft, and other vehicles. For example, HUD systems can be deployed in vehicles so that an operator or driver of the vehicle can see information relevant to the operation of the vehicle while maintaining a forward gaze and without having to look down or away towards a display screen. Thus, HUD systems are believed to improve safety by minimizing the need for a vehicle operator to look away from a safe operating viewpoint.

However, HUD systems have often suffered from poor optical quality in the projected image, which may result in an undesirable aesthetic quality to the projected image. Poor optical quality may even decrease the safety of HUD systems, because blurry or unclear projected images can make it more difficult for users to read or understand the projected information, resulting in increased user processing time of the information, delayed user reaction time based on the information, and increased user distraction. Reduced optical quality can result from a sub-optimal mirror used in the HUD system, often resulting from improper shaping of the mirror or defects introduced into the mirror during curving of a mirror preform.

Thus, there remains a need for HUD systems, and particularly improved mirrors for HUD system, that have improved optical quality, as well as improved methods of forming such mirrors.

DISCLOSURE OF INVENTION

Technical Problem

There remains a need for HUD systems, and particularly improved mirrors for HUD system, that have improved optical quality, as well as improved methods of forming such mirrors.

Solution to Problem

In some embodiments of the present disclosure, a method of forming a three-dimensional mirror for a heads-up display (HUD) system is provided. The method includes providing a glass-based preform having a first major surface, a second major surface opposite to the first major surface, and a minor surface connecting the first and second major surfaces, the minor surface including first and second longitudinal side surfaces opposite to each other and first and second transverse side surfaces connecting the longitudinal side surfaces. The method includes disposing the glass-based preform on a mold having a concave surface such that the second major surface faces the concave surface of the mold, and such that the first and second longitudinal side surfaces are adjacent to a longitudinal wall of a housing, the longitudinal wall extending from the concave surface to at least a height of the second major surface of the glass-based preform. The method also includes supplying a vacuum to a gap between the second major surface and the concave surface, and conforming the second major surface to the concave surface of the mold using the vacuum. The first and second transverse side surfaces have a curved shape corresponding to a curve of the concave surface such that the first and second transverse side surfaces remain coincident with the concave surface during the conforming of the second major surface.

In additional embodiments of the present disclosure, an apparatus for forming a three-dimensional mirror for a heads-up display (HUD) is provided. The apparatus includes a mold comprising a concave surface with at least one opening configured to supply a vacuum to a space above the concave surface when a glass-based preform is disposed on the mold, and a housing adjacent to and at least partially surrounding the concave surface. The housing extends from the concave surface to at least a height of the glass-based preform when the mirror preform is disposed on the mold, and the housing is sized to prevent leakage of the vacuum at a portion of the space between the glass-based preform and the concave surface.

In other embodiments of the present disclosure, a method of forming an aspheric mirror from a two-dimensional glass-based preform is provided. The method includes providing a glass-based preform comprising a first major surface, a second major surface opposite the first major surface, and a minor surface connecting the first and second major surfaces. The minor surface includes first and second longitudinal side surfaces opposite to each other and first and second transverse side surfaces connecting the longitudinal side surfaces the glass-based preform having a substantially two-dimensional shape. The method also includes disposing the glass-based preform on a lower mold comprising a curved surface having an aspheric shape facing the second major surface, the lower mold being configured to supply a vacuum to a gap between the curved surface and the second major surface, and performing a primary forming step by supplying vacuum pressure to the gap while a shell surrounds the glass-based preform such that a substantially vertical wall of the shell extends from the curved surface to at least the second major surface, the substantially vertical wall facing the minor surface. The substantially vertical wall of the shell is spaced from the minor surface at a distance to improve the vacuum pressure in the gap. The method can further include a secondary forming step by applying a clamping-ring to a periphery portion of the first major surface to hold the second major surface against the curved surface at the periphery portion, where the second forming step is performed while the lower mold is supplying a vacuum to the gap.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF DRAWINGS

For the purposes of illustration, there are forms shown in the drawings that are presently preferred, it being understood, however, that the embodiments disclosed and discussed herein are not limited to the precise arrangements and instrumentalities shown.

BEST MODE FOR CARRYING OUT THE INVENTION

Figure 1:
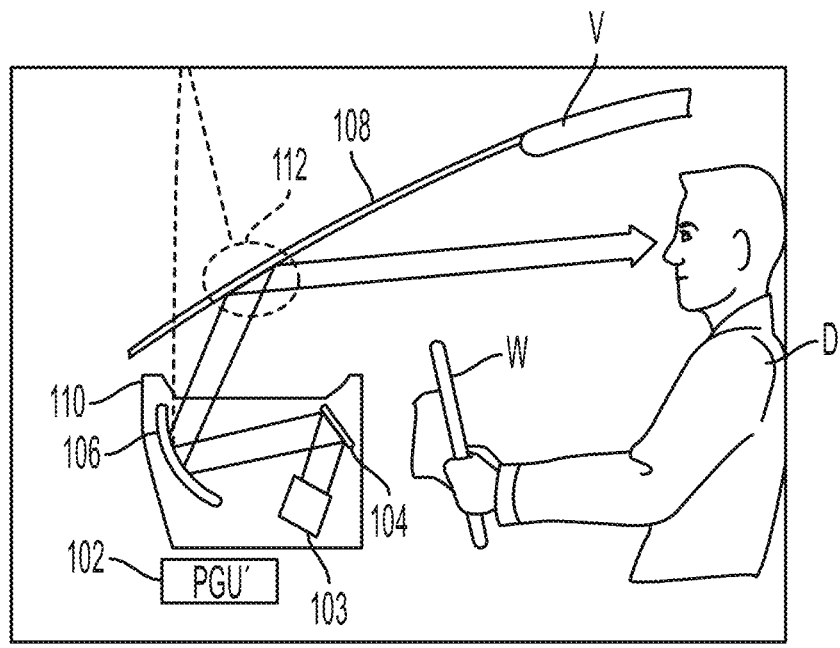
FIG. 1 is an illustration of HUD system in a vehicle according to some embodiments of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the following description of exemplary or illustrative embodiments is provided for the purpose of illustrating the principles of the present disclosure and not in limitation thereof and may include modification thereto and permutations thereof.

HUD systems can be used to provide a wide variety of types of information for improved safety and convenience of users. In transportation, for example, information relevant to vehicle operation, such as vehicle gauges or navigation, can be projected to an area in front of a driver. This can include real-time information on vehicle speed, fuel level, climate control settings, entertainment settings, turn-by-turn navigation indicators, estimated time of arrival, and alerts related to speed, traffic, or dangerous conditions. Information can be presented as text, symbols, pictures, videos, animation, and one or more colors. These are examples only, and embodiments of this disclosure are not intended to be limited to these examples.

In some embodiments of the present disclosure, a HUD system can include an image generating device and one or more optical components for directing or projecting an image from the image generating device to an area that is easily visible to a user. The image generating device can include a cathode ray tube (CRT) display, a light-emitting diode (LED) display, a liquid crystal display (LCD) assembly, laser projection system, or other type of display known by those of ordinary skill in the art. The HUD system may also include a computer or processor for generating the images produced by these displays. The optical components may include some combination of lenses, beam splitters, mirrors, and combiner, for example. The combination of components of a HUD system can be configured to produce collimated light.

The collimated light is projected onto a combiner that is in a field of view of a user so that the user can see the projected image and the normal field of view simultaneously. For example, in vehicular applications, the combiner can be a windshield. Alternatively, the combiner can be a separate component that is built into the vehicle, or a portable component that can be mounted in the vehicle in a location where a driver or passenger can see the projected image on a transparent surface of the combiner. The mirror can include a reflective coating on a curved substrate. The curved substrate may be spherical, aspherical, a Fresnel shape, and/or diffractive. In one preferred embodiment, the mirror has a reflective surface or coating on a concave, aspherical surface.

Figure 2:
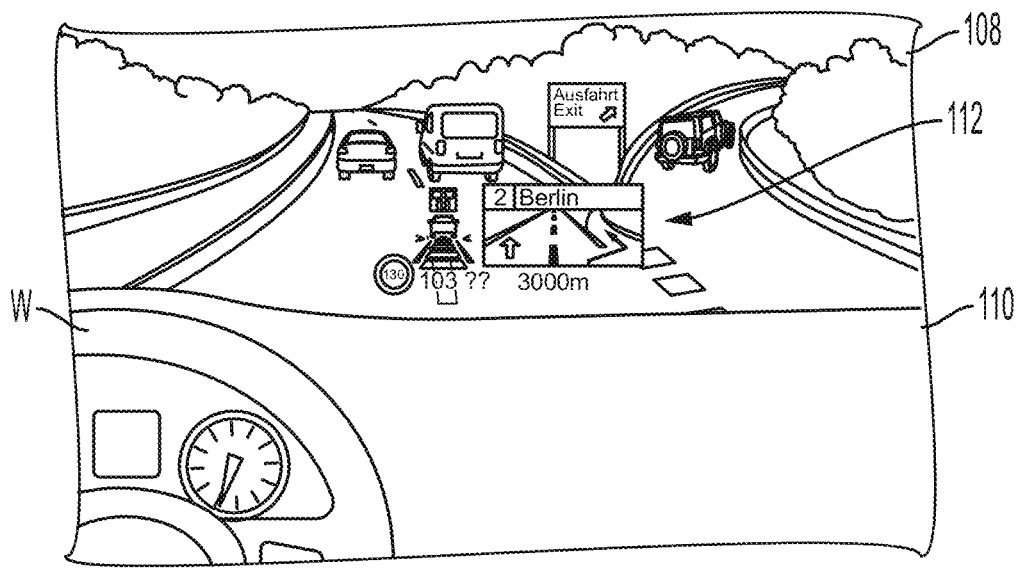
FIG. 2 is an illustration of an automobile driver's viewpoint when using the HUD system of FIG. 1, according to some embodiments.
Figure 3:
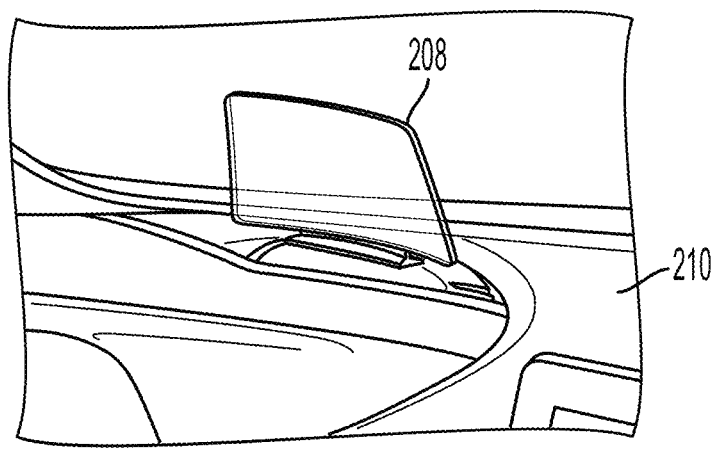
FIG. 3 is a photograph of a combiner used in some HUD systems according to some embodiments of the present disclosure.
Figure 4:
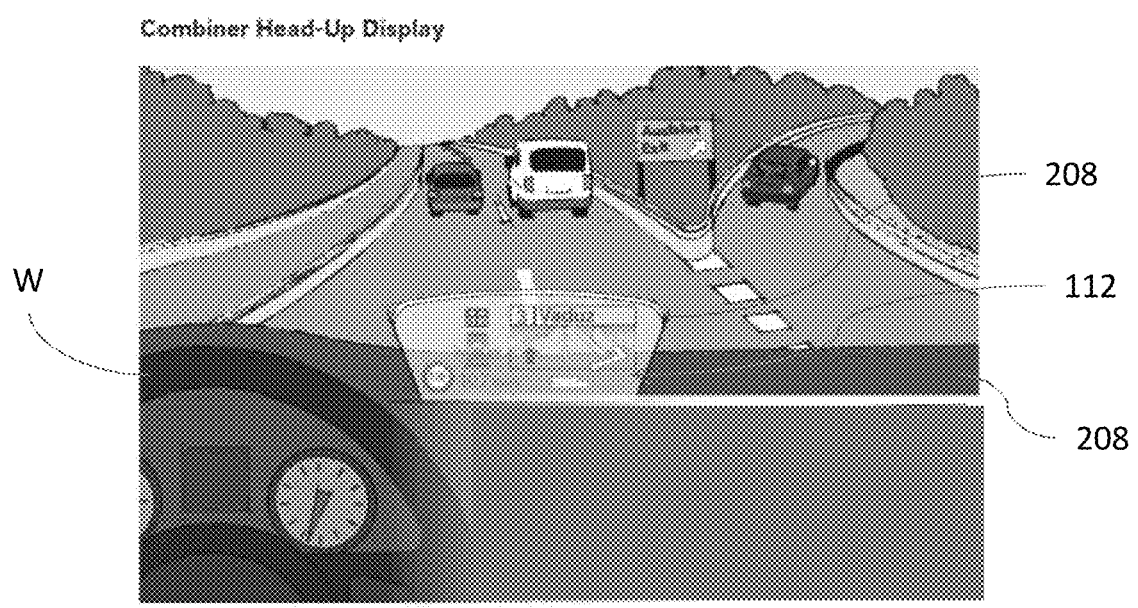
FIG. 4 is an illustration of an automobile driver's viewpoint when using a HUD system with a combiner similar to the one shown in FIG. 3, according to some embodiments.

FIG. 1 shows an example of a HUD system 100 according to some embodiments of the present disclosure. The HUD system 100 is shown in an automobile, but embodiments can be used in various vehicles or non-vehicular applications. A driver D is shown with hands on the steering wheel W of the vehicle V. The HUD system 100 is incorporated into the dash 110 of the vehicle V, and includes a programmable graphical unit (PGU) 102 connected to an image source 103 configured to produce an image based on a signal from the PGU 102. The PGU 102 may include a processor operably connected to a non-transient, computer-readable storage medium containing instructions that, when executed, generate and/or supply data for generating a image by the image source 103 to be displayed by the HUD system 100. That image is reflected by a flat mirror 104 towards a curved mirror 106. From the curved mirror 106, the image is projected toward the windshield 108 and onto a projection area 112 of the windshield 108. The HUD system 100 can be configured so that the projection area 112 is within the normal line of sight of the driver D while driving the vehicle V. For example, the projection area 112 can be positioned so that the projected image is overlaid on the road as seen from the driver's perspective. An example of this scenario is shown in the illustration of FIG. 2.

While the projection area 112 is located on the windshield 108 in FIGS. 1 and 2, FIGS. 3 and 4 show an alternative embodiment in which a combiner 208 is used for the location of the projection area 212. The combiner 208 can be built into the dash 210 of a vehicle or can be a portable or separable component that is positioned on top of the dash 210.

Figure 5:
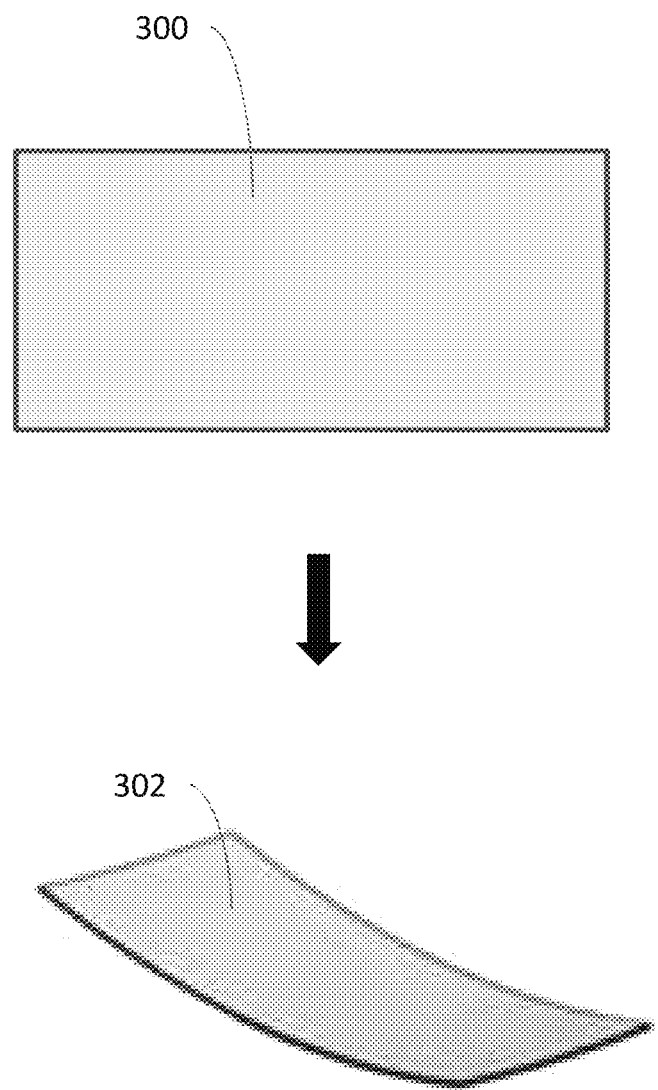
FIG. 5 is a plan view of a 2D mirror preform and a resulting aspheric mirror formed from the 2D mirror preform according to some embodiments.

Embodiments of this disclosure are not limited to one or more particular arrangements of the optical components of a HUD system, as persons of ordinary skill in the art will understand the basic arrangement of components in a HUD system. The present disclosure is directed primarily to the curved mirrors used in HUD systems, and to systems and methods for forming such mirrors. In particular, embodiments are directed to system and methods of forming such three-dimensional (3D) mirrors from two-dimensional (2D) mirror preforms. FIG. 5 shows an example of a 2D mirror preform 300 that can be used to form a 3D mirror 302 using systems and methods discussed herein.

There are various systems and methods conventionally used for forming 3D mirrors. However, the authors of the present disclosure realized that improvements were needed in the design of and the methods of forming the curved mirrors used in HUD systems. To prevent degradation of image quality as the image is reflected by the curved mirror, the mirror should have a high level of shape accuracy and surface roughness. For example, a shape precision of less than 50 μm and a surface roughness (Ra) of less than 3 nm is desirable. A particular type of optical distortion that occurs in mirrors for HUD systems is referred to as edge distortion, which is optical distortion of light reflected at or near the edge of the mirror. In existing HUD systems, optically impactful imperfections may be introduced into the mirror during manufacturing or shaping of the mirror. These imperfections can include artifacts such as raised or lowered portions created by equipment in the manufacturing of the mirrors, or imperfections in the curvature of the mirror, particularly in the curvature at or near the edges of the mirror.

The most common methods for forming 3D-shaped mirrors or mirror substrates can be divided into two categories: pressing methods and vacuum-forming methods. Both pressing and vacuum-forming methods, however, can have disadvantages. In a pressing method, upper and lower molds are used to press the substrate, such as a glass substrate, by physical force. For example, the upper mold may be pressed into a lower mold with a 2D glass preform disposed between the two molds, and the glass preform is formed according to the shape of a surface on one or both of the molds. As a result, mold imprints may be left on both the concave and convex surfaces of the formed glass substrate, which then requires polishing. In addition, due to deviations in the contours of the upper and lower molds, it can be difficult to precisely match the contours of the upper and lower molds, and thus difficult to achieve a precise shape for the formed glass substrate. For example, the specification for aspheric mirror contours can be less than ±25 μm, while the mold contour deviation after machining is normally 30-50 μm.

Figure 6:
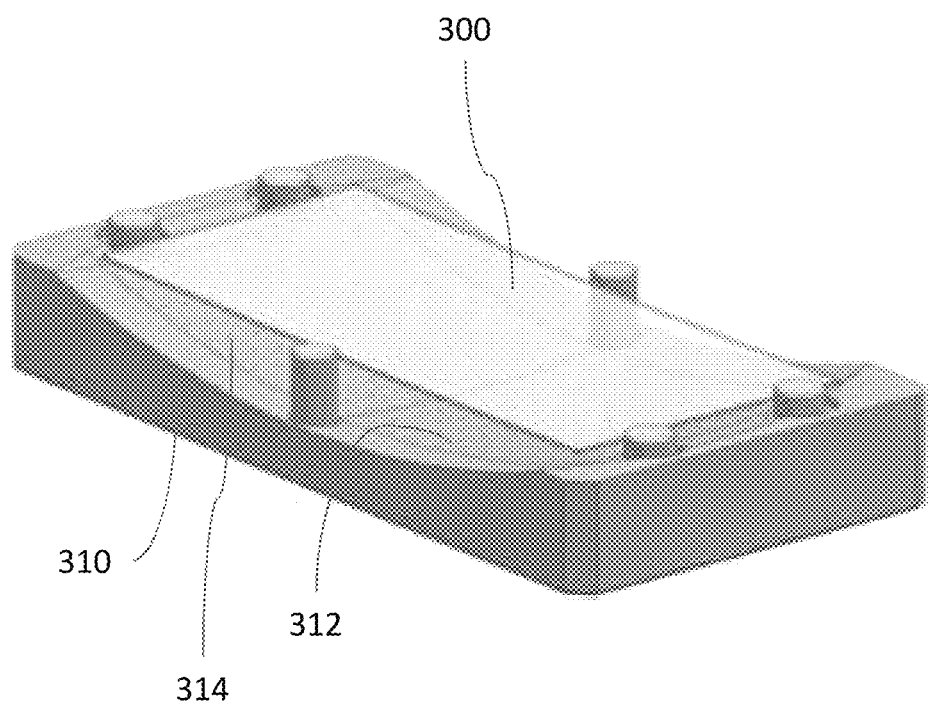
FIG. 6 is an isometric view of a 2D mirror preform on a bending mold according to some embodiments.

In a vacuum forming method, a single mold (e.g., lower mold) can be used, where vacuum holes are formed in the surface of the mold. For example, as shown in FIG. 6, a flat (2D) glass sheet or 2D preform 300 is disposed on or above the forming surface 312 of the mold 310 and vacuum pressure is supplied via the vacuum holes 314 to conform the mirror preform to the curved (3D) surface of the mold. The forming surface 312 is shaped to a desired shape of the 3D mirror. However, it is difficult to avoid the formation of vacuum hole marks on the surface of the formed glass substrate. These vacuum hole marks or manufacturing artifacts can impair the optical performance of the substrate or the finished mirror. In addition, typical vacuum forming methods can require higher forming temperatures compared to pressing methods. Higher forming temperatures can affect surface quality and form defects such as dimples, pits, and imprints. Vacuum forming can be performed on a mirror preform, which is a substrate that is pre-cut to the desired size before forming into a 3D shape with vacuum forming, or on an oversized sheet of glass, which is cut to the desired size after forming into a 3D shape with vacuum forming. Both preform-based and oversized-glass-based vacuum forming have certain advantages and disadvantages.

Oversized-glass-based forming, for example, has advantages of achieving good edge quality due to edge cutting, and good surface roughness due to lower forming temperatures. However, oversized-glass-based forming requires the added steps of cutting the glass after forming; has low glass utilization due to trim glass or waste glass after forming; requires edge polishing and/or chamfering after cutting; and requires larger equipment even though the eventual finished product may be the same size as that formed in preform-based forming.

On the other hand, in preform-based vacuum forming, there is no need to cut the mirror substrate after vacuum forming, which reduces the production of waste or cullet glass. In addition, preform-based forming can be a more simple process and more cost effective. However, in a preform-based vacuum forming method, it has been difficult or impossible to apply a relatively uniform vacuum pressure over the entire surface of the glass sheet due to vacuum leaks at one or more edges of the glass preform, due at least in part to vacuum leakage between the preform and the mold. For example, if the formed glass is to have a single radius of curvature, the short-side edge of the preform may maintain contact with the mold surface until forming is complete, but the vacuum will leak along the long-side edge of the preform. In the case of more complex curvature or an aspheric mold surface (and aspheric formed substrate), only discrete points of the glass sheet, such as the four corners, may contact the mold surface throughout forming, which results in vacuum leakage along all edges of the glass substrate. Also, for forming an aspheric mirror, it is possible for the corner of the mirror or mirror substrate to chip or break, which occurs when only the corners of the mirror substrate are in contact with the mold and an external force (e.g., vacuum pressure, mold pressing force) is applied, thus concentrating pressure at the four corners of the substrate. In some cases, such as when the forming surface is not aspheric but has a single radius of curvature, the short-side edge of a preform may maintain better contact with the forming surface until forming is completed, but a vacuum leak can occur along the long-side edge of the preform. These gaps or leaks in vacuum pressure make it difficult or impossible to provide relatively uniform vacuum pressure to the entire surface of the mirror or preform. As such, higher forming temperature (and lower viscosity of the substrate) is used to conform the glass onto the mold surface more completely, and to reduce the stress near the corners to reduce chipping. However, as discussed above, higher temperatures cause surface degradation of the glass substrate and decreased optical performance. Even with higher temperatures, edge distortion of the mirror occurs.

Investigators behind the present disclosure have discovered systems and methods to improve the mirrors formed using vacuum-based forming methods. In some preferred embodiments, these techniques may be particularly well-suited for the preform-based forming methods. However, some embodiments are not limited to mirrors made using the preform-based forming methods, nor even to vacuum-based methods, generally. One problem addressed by the embodiments of the present disclosure is that of edge distortion. As mentioned above, when using vacuum forming methods, it can be difficult to achieve a uniform vacuum and uniform conformation of the mirror substrate to the mold. It can be particularly difficult to conform the mirror substrate to the desired shape at or near the edges of the substrate, which causes edge distortion and degrades the quality of the image reflected by the mirror near the edge. Therefore, embodiments of the present disclosure provide mirrors and/or mirror substrates with improved optical performance, including at the edge, and methods of forming the same.

Figure 7:
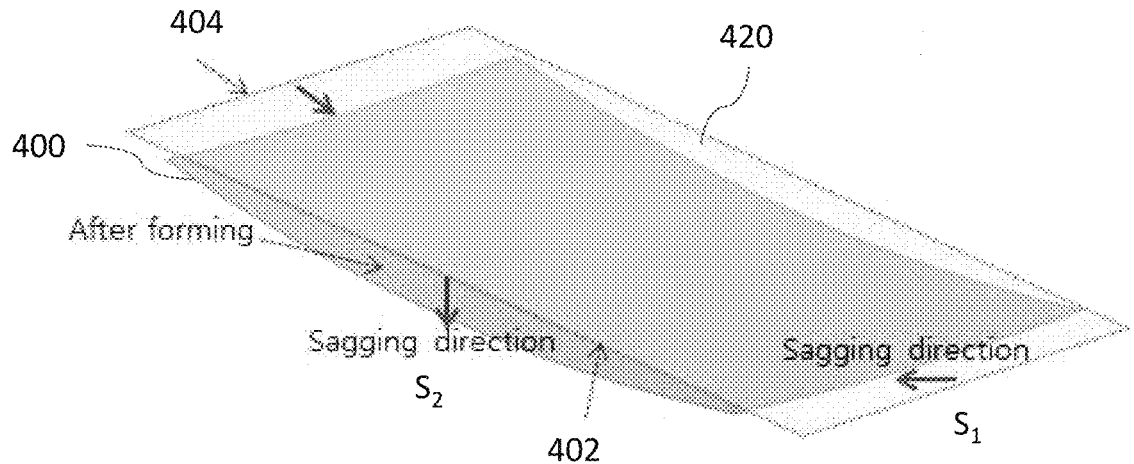
FIG. 7 is a schematic representation of a 2D reference plane corresponding to a 2D preform before undergoing a 3D forming step and a 3D mirror after undergoing the forming step.
Figure 8:
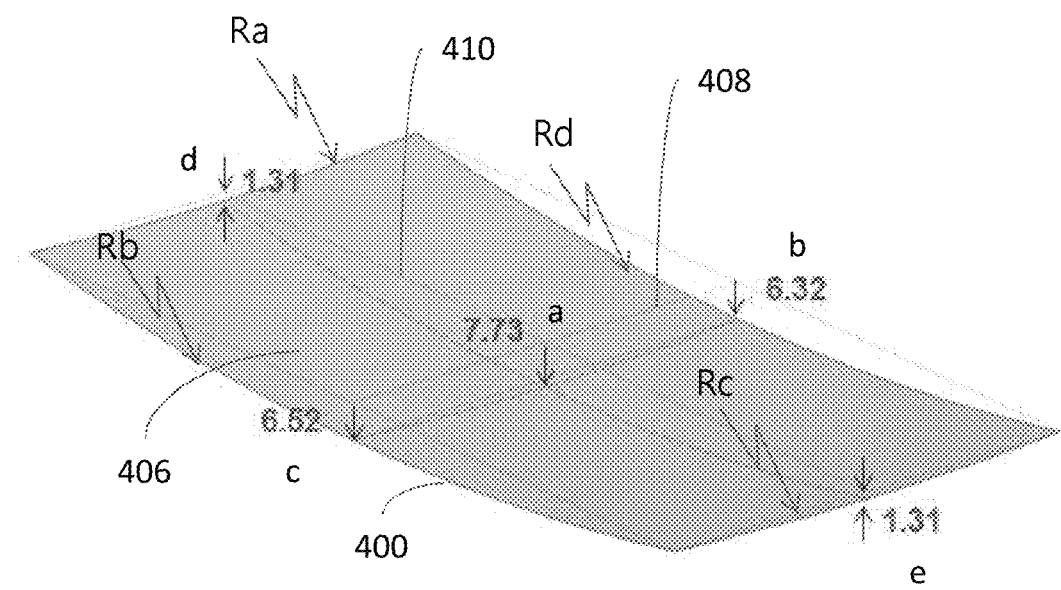
FIG. 8 is an isometric illustration of an aspheric mirror for a HUD system according to some embodiments.

The mirrors in HUD systems generally have an aspheric reflective surface, which can include a reflective coating formed on an aspheric surface of a mirror substrate. As discussed above and shown in FIG. 7, a 3D mirror 400 may be formed from a 2D mirror preform 420. As a rectangular preform, the mirror preform 420 has a long-side edge 402 and a short-side edge 404. In forming the 3D mirror, the long-side edge 402 and the short-side edge 404 bend to conform to the forming mold. Based on the shape of the forming mold, as determined by the desired shape of the resulting 3D mirror, the linear distance between opposite short-side edges 404 decreases, and the magnitude of the decrease between the short-side edges may differ from that of the long-side edges. An aspheric or aspherically shaped surface has multiple radii of curvature. In particular, in the case of a four-sided mirror as shown in FIGS. 7 and 8, for example, an aspheric surface has a different radius of curvature along each of the four edges. Thus, as shown in FIG. 8, a mirror 400 has a reflective surface 408 that is aspherically shaped with a radius of curvature Ra along a first edge, a radius of curvature Rb along a second edge, a radius of curvature Rc along a third edge, and a radius of curvature Rd along a fourth edge. Because the surface 408 is aspherically shaped, Ra≠Rb≠Rc≠Rd. In addition, Rb and Rd may be less than Ra and Rc. Due to the differences in curvature of the long-side edges as compared to the short-side edges, a change in the distance between the short-side edges 404 due to forming may be greater than any decrease of the distance between opposite long-side edges 402 due to the smaller radii of curvature Rb, Rd on the long-side edges and the larger radii of curvature Ra, Rc on the short-side edges. This can make it more difficult to prevent leaking of the vacuum pressure along the short-side edge. FIG. 8 also shows how different points on the curved surface 408 have been displaced by varying amounts a-e with respect to a two-dimensional plane 406 connecting the four corners of the mirror 400. In some embodiments, a≠b≠c≠d. In one example, displacements a-e may be equal to the following: a=7.73, b=6.32, c=6.52, d=1.31, and e=1.31, where the displacements are given in unitless, relative magnitudes, but the units of displacements a-e may be in millimeters. The two-dimensional plane 406 comprises a minor axis 408 between opposite long-side edges of the 2D preform and a major axis 410 between opposite short-side edges of the 2D preform.

Figure 9:
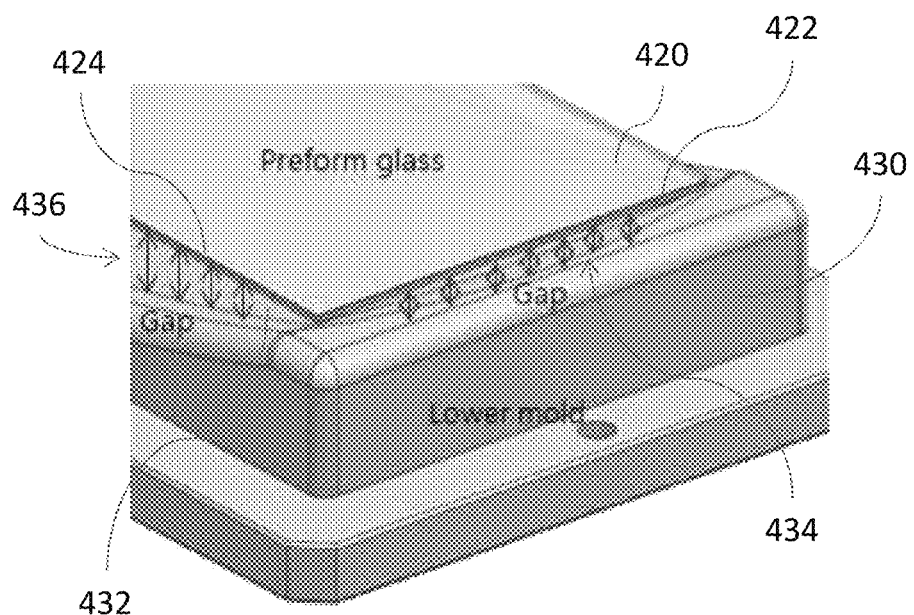
FIG. 9 is an isometric view of a 2D mirror preform on a forming mold, according to some embodiments.

As shown in FIG. 9, when a 2D mirror preform 420 is disposed on a forming mold 430, only the corners of the mirror preform 420 may contact the forming mold 430 prior to a conforming the preform 420 to forming surface 432. As such, a gap remains between the mirror preform 420 and the forming surface 432. In particular, a gap 434 remains between a short-side edge 422 of the mirror preform 420 and a gap 436 remains between a long-side edge 424 of the mirror preform 420. To the extent gaps 434 and 436 remain open during a conforming step of the preform 420 to the forming surface 432, some of the vacuum suction from the vacuum holes in the forming surface 432 is lost. This can lead to sub-optimal conforming of the mirror preform 420 to the forming surface 432, and thus to a failure to achieve the desired shape of the 3D mirror.

Figure 10:
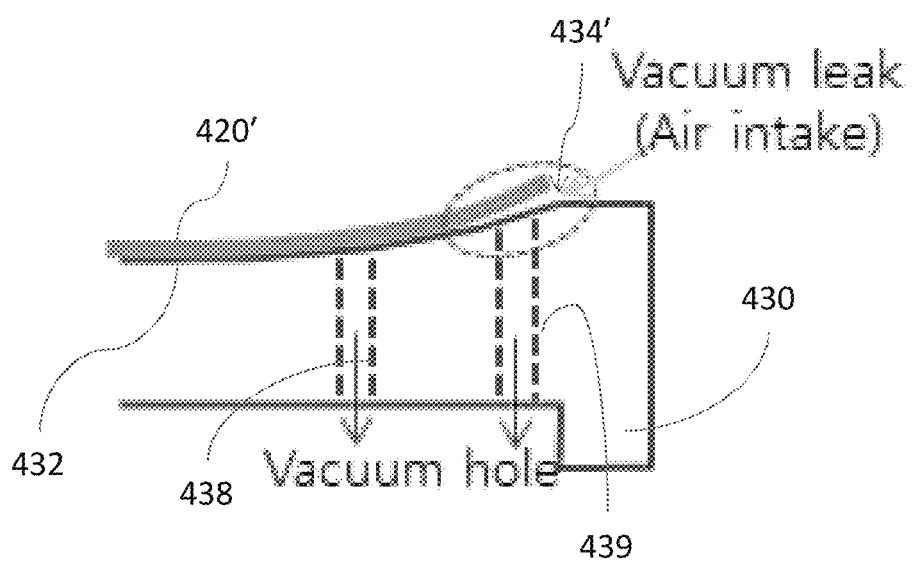
FIG. 10 is a cross-section schematic of a gap between a forming mold and an edge of a preform during forming.

FIG. 10 shows a cross-section view of an edge of a 3D mirror 420' during or after a step of conforming the 2D mirror preform 420 of FIG. 9 to the forming mold 430. While there may be good conformity between the forming surface 432 and an interior portion of the 3D mirror 420' near one or more interior vacuum holes 438, a gap 434' can remain near an edge of the 3D mirror 420'. As shown in FIG. 10, gap 434' can remain even when a vacuum hole 439 is located near the edge, because vacuum suction is lost as a result of the gap 434'. As a result, the desired curvature of the 3D mirror 420' is not achieved near the edge. Due to the above-discussed challenges in maintaining precise control over the shape of a 3D mirror formed by vacuum forming, the investigators of the present disclosure developed systems and methods capable of achieving improved 3D mirrors. In particular, these systems and methods allow for improved suction and forming at or near the edge of a 3D mirror using vacuum forming of a 2D preform.

Figure 11A:
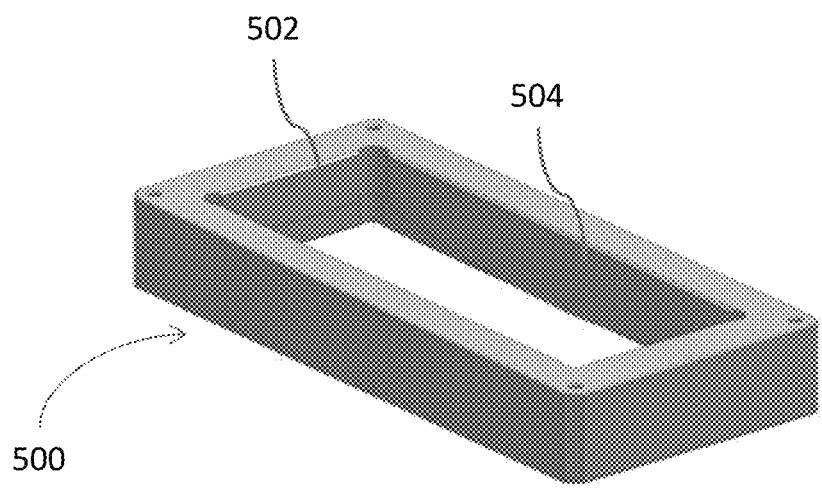
FIGS. 11A and 11B are isometric views of examples of housing assemblies used for improved forming of a curved mirror.

In some embodiments, as shown in FIG. 11A, a housing 500 can be used during a step of conforming a 2D preform to a 3D forming surface. The housing 500 forms a ring-like shape with side walls or sealing surfaces configured to be positioned at or near one or more edges of a mirror preform during the step of conforming to the vacuum mold. In FIG. 11A, the mold 500 includes short-side walls 502 and long-side walls 504, which in combination form a ring-like shape with a space in the middle that is sized and shaped to contain a preform.

Figure 11B:
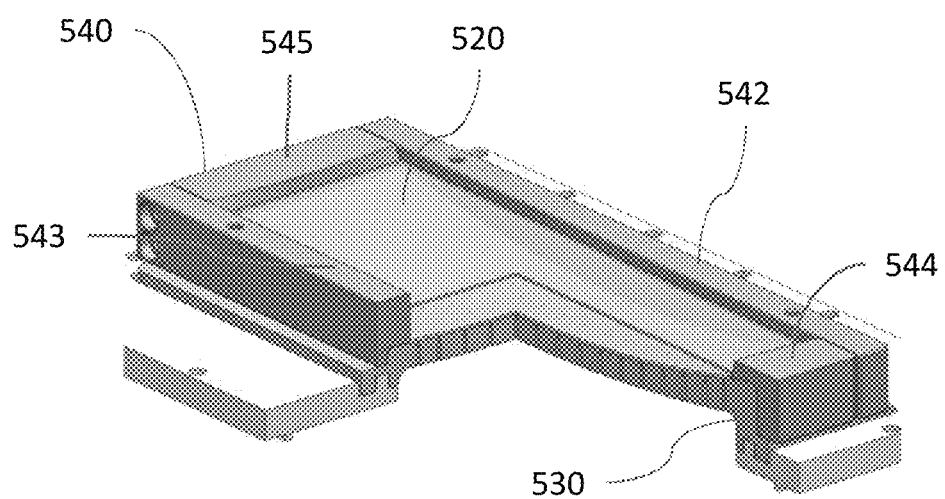

An example of a housing 540 positioned on a forming mold 530 is shown in FIG. 11B. The housing 540 surrounds the perimeter of the forming surface of mold 530 and defines a space in which the mirror preform 520 is placed for forming. The housing 540 includes opposite short-side walls 544, 545, and opposite long-side walls 542, 543. The housing 540 operates to minimize vacuum leaking at the edges of the mirror preform 520. The housing 540 does not necessarily need to touch the mirror preform 520 to improve vacuum performance. Indeed, it may be advantageous in some embodiments for there to not be physical contact between the housing 540 and the preform 520 so that the preform 520 can move without friction forces from the housing 540 that could negatively impact the finished product. The clearance between the inside walls of the housing 540 may be, for example, 0.5 mm or less, in some embodiments. However, this clearance can be adjusted based on the coefficient of thermal expansion of the glass-based preform 520 and the housing 540.

Figure 12:
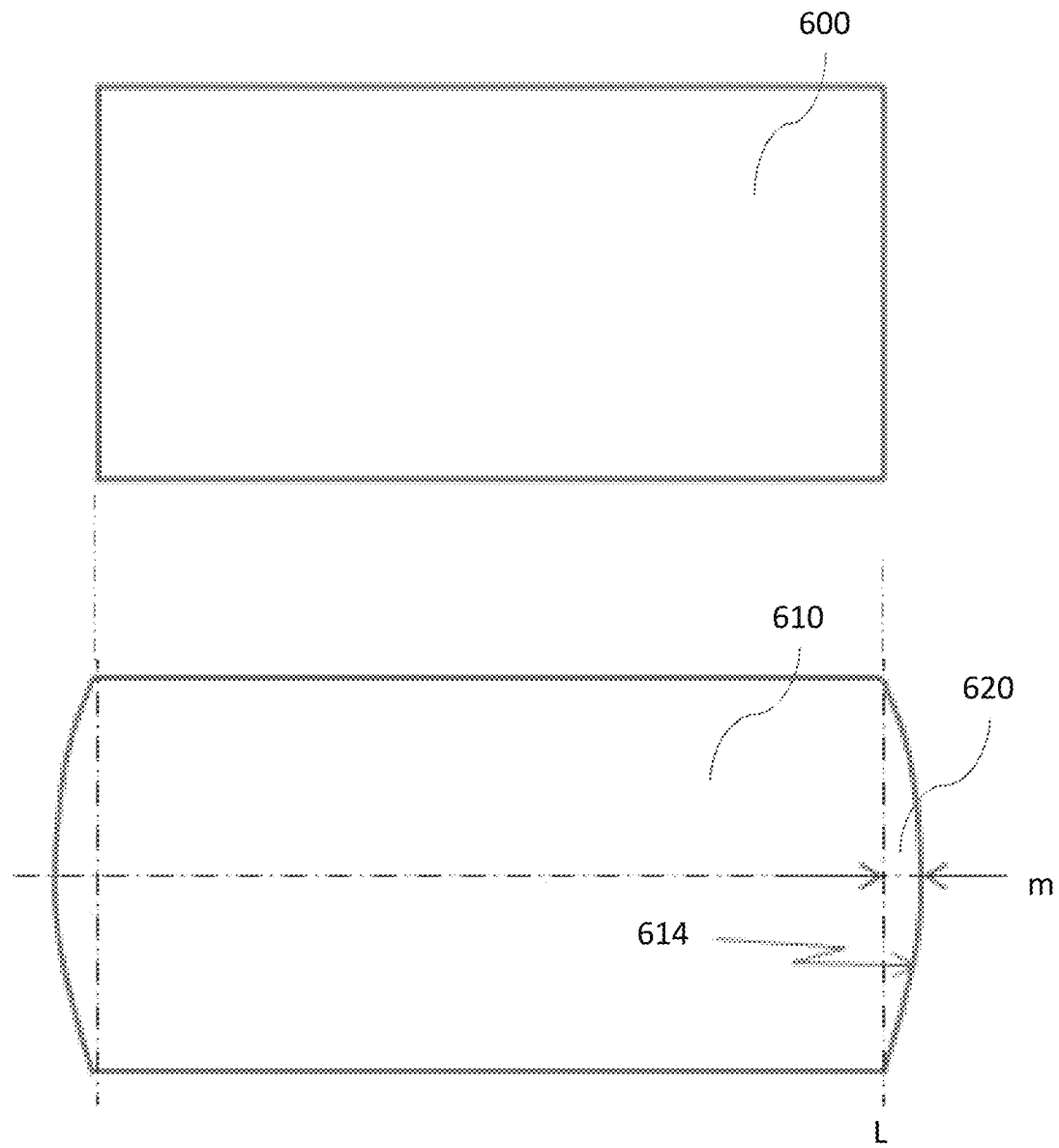
FIG. 12 is a plan view of a rectangular mirror preform (top) and a plan view of a mirror preform with curved end edges (bottom) according to some embodiments.

Even when using a housing as shown in FIG. 11B, it is possible that, during forming of the 2D preform into a 3D mirror, a gap can appear at one or more edges of the preform, which can result in loss of suction near the edge. For example, depending on the curvature of the forming surface, there can be significant transverse movement of edges during forming, as discussed above and shown in FIG. 7. Thus, as the short-side edges 404 of the preform 400 in FIG. 7 move toward each other, the short-side edges 404 would correspondingly move away from a housing provided around the preform 400, which can result in a gap at the short-side edge 404. Accordingly, some embodiments include a preform having at least one edges shaped to coincide with a curvature of the forming surface where that edge of the preform meets the forming surface. One example of such a preform is shown in the lower half of FIG. 12, where a standard, rectangular preform 600 is shown in the top half of FIG. 12. Specifically, the preform 610 has an extended surface area 620 with a curved edge 614. The extended surface area 620 extends beyond a line L where the edge of the preform is located in a standard preform 600, and the curved edge is shaped to coincide with a forming surface. The curved edge 614 on the short-side edge allows the preform 610 to keep sufficiently close contact between the preform 610 and the concave surface of mold during forming. In other words, the short-side edge, when curved, can maintain contact with the concave forming surface from the start to the finish of the forming process. The curvature of the curved edge 614 can be composed of a single radius of curvature or a spline curve to more accurately follow the curvature of the top surface of the mold.

Figure 13A:
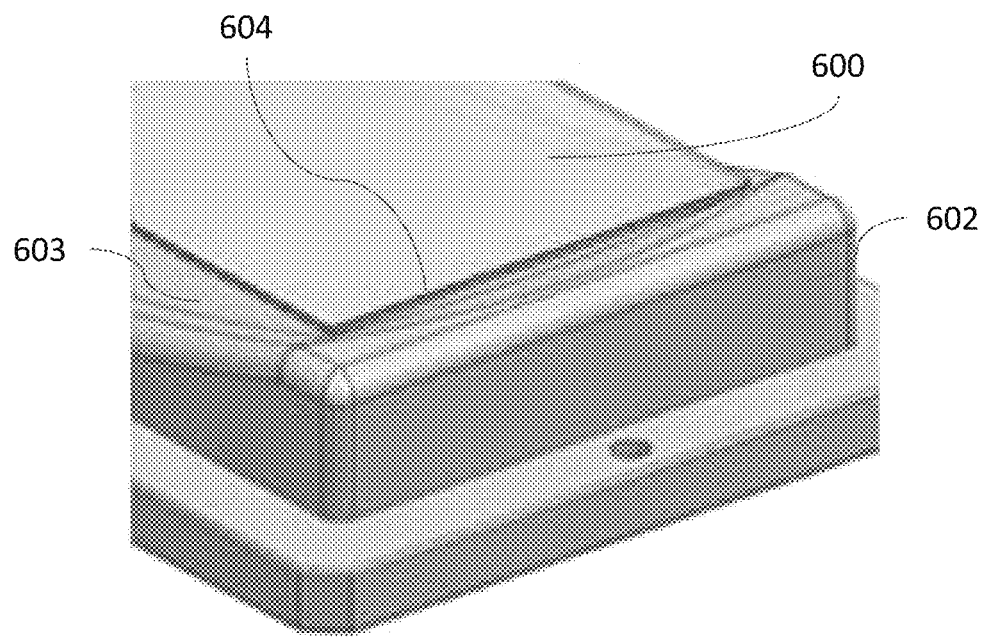
FIG. 13A shows an isometric view of the rectangular mirror preform of FIG. 12 on a forming mold.
Figure 13B:
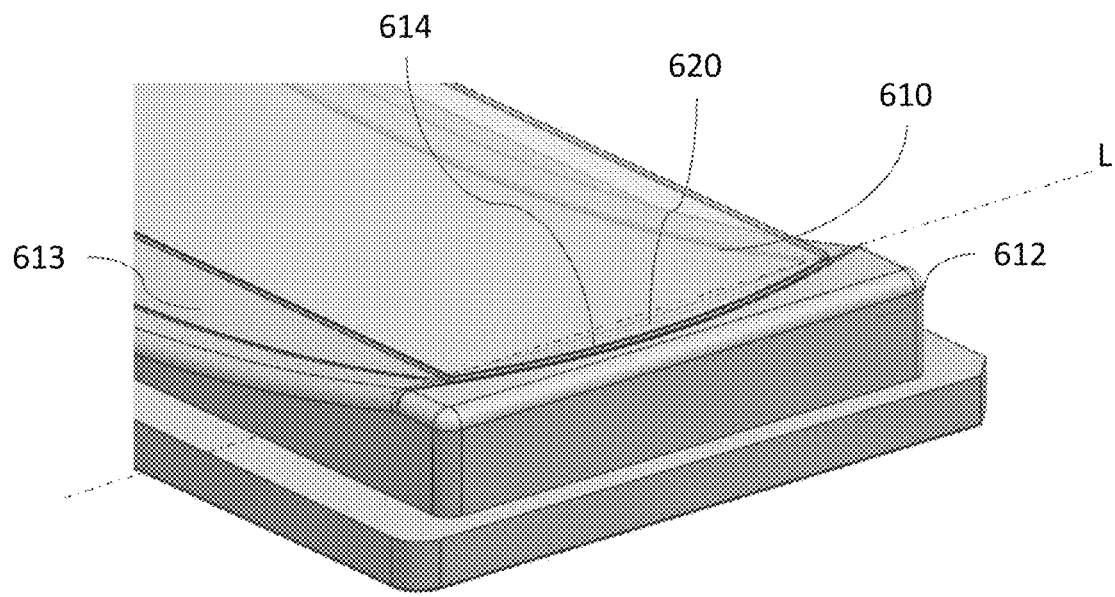
FIG. 13B shows an isometric view of the mirror preform with curved end edges of FIG. 12 on a forming mold, according to some embodiments.

As used herein, "coincide" or "coincident" means that the curvature of the curved edge of the preform is an approximate match for a curvature in the forming surface that is located at an intersection of the preform and the forming surface. The curve in the forming surface that is coincident with the curved edge can be considered an intersection curve between the curved forming surface and a reference plane which contains the 2D preform when placed on the mold. This is shown in FIG. 13B, where preform 610 is placed above the forming surface 613 of the mold 612. Whereas preform 600 in FIG. 13A has a straight short-side edge 604, preform 610 has a curved short-side edge 614 that is coincident with the curvature of the molding surface 613 where the 2D preform 610 is placed. In one preferred example, the curvature of the short-side edge of preform 610 has approximately the same radius of curvature as the intersection curve. Because the extended surface area 620 is extended from what is to become the effective area of the 3D mirror, the projected image of the HUD mirror is not negatively affected by the extended area 620.

Figure 14A:
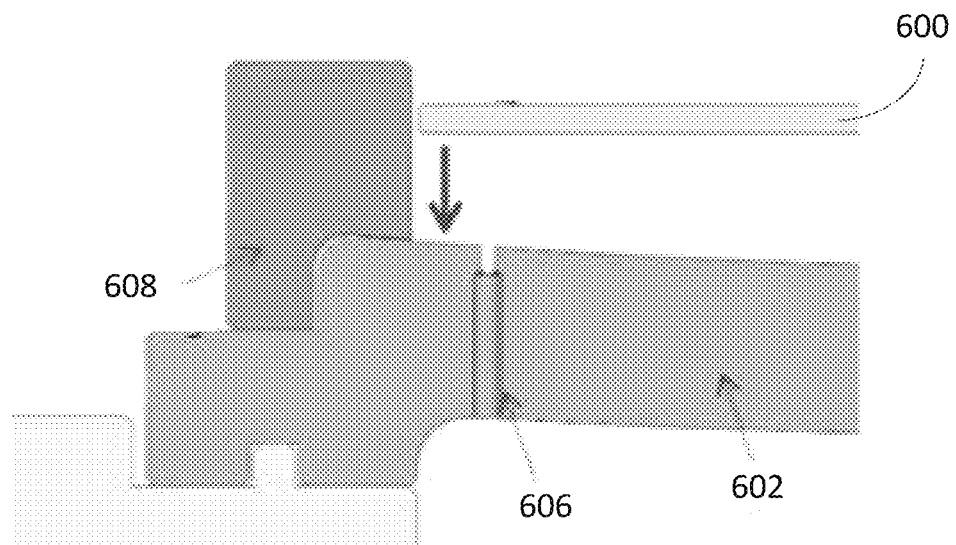
FIGS. 14A and 14B show cross-section views of the long-side and short-side edges, respectively, of the rectangular mirror preform of FIG. 13A on a forming mold.
Figure 14B:
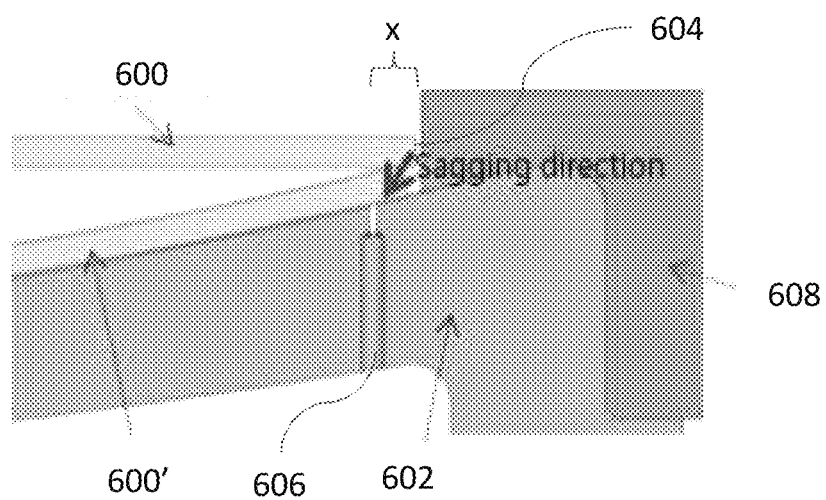
Figure 15A:
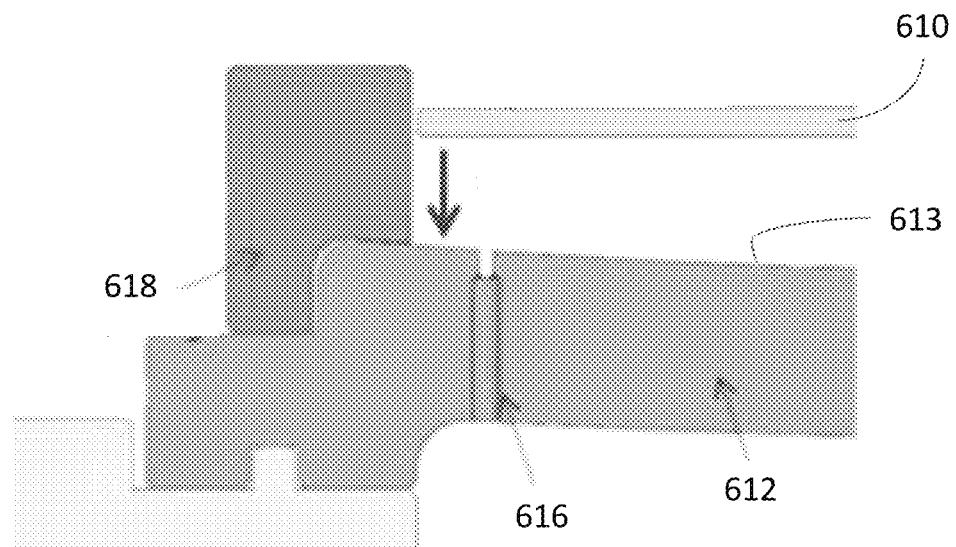
FIGS. 15A and 15B show cross-section views of the long-side and short-side edges, respectively, of the mirror preform with curved end edges of FIG. 13B on a forming mold, according to some embodiments.
Figure 15B:
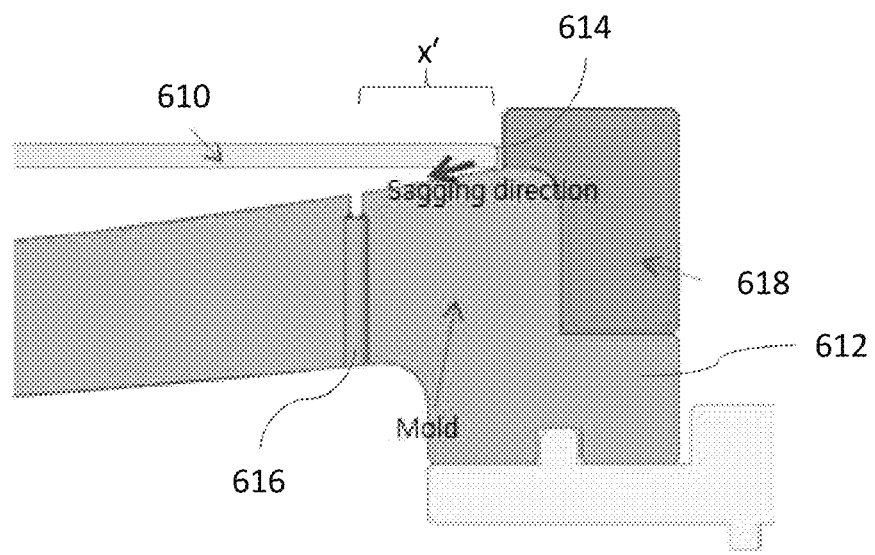

FIGS. 14A and 14B show cross-section views of the long-side edge and short-side edge, respectively, of a standard preform 600 on a mold 602, where preform 600 has a straight or non-curved short-side edge 604. For the long-side edge, the direction of sagging (shown by the arrow in FIG. 14A) during forming is substantially vertical, so that the long-side edge does not move significantly away from the housing 608. As such, there is low risk of the vacuum hole 606 being exposed or losing vacuum pressure. On the other hand, the direction of sagging (shown by the arrow in FIG. 14B) can have vertical and horizontal components. The horizontal movement or shrinkage pulls the short-side edge away from the housing 608 and threatens to reduce vacuum pressure near the short-side edge. The distance x represents the relative short distance between the short-side edge 604 and the vacuum hole 606. In contrast, FIGS. 15A and 15B show cross-section views of the long-side edge and the short-side edge, respectively, of a preform 610 according to embodiments of this disclosure. The preform 610 includes a curved short-side edge 614. The movement of the long-side edge in FIG. 15A is substantially the same as described for FIG. 14A. However, in FIG. 15B, there is a larger distance x' between the housing 618 and the vacuum hole 616. This long distance, coupled with the curved edge that coincides with the forming surface of the mold 612, helds to ensure that vacuum pressure is maintained near the edge.

Figure 16A:
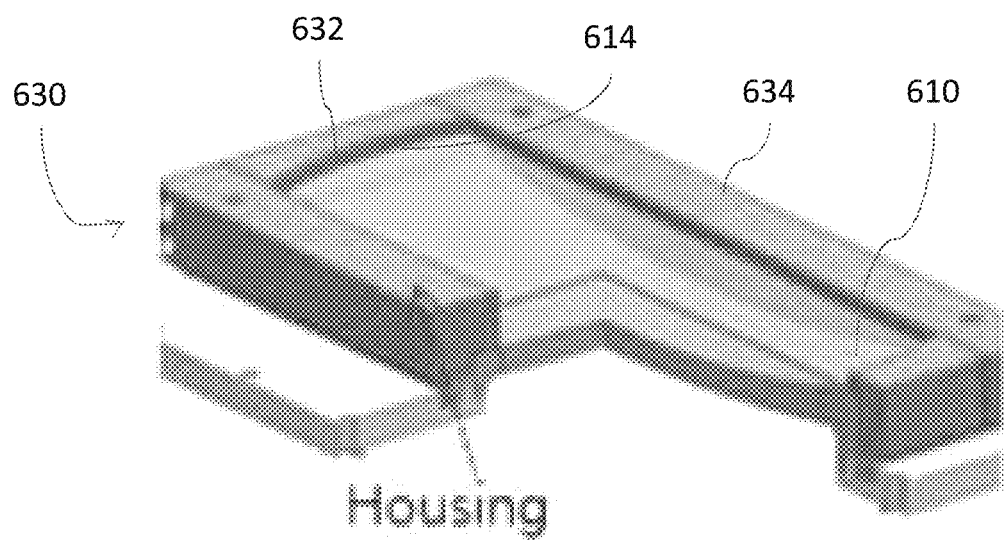
FIGS. 16A and 16B show isometric and plan views, respectively, of a housing used with a mirror preform having a curved end edge according to some embodiments.
Figure 16B:
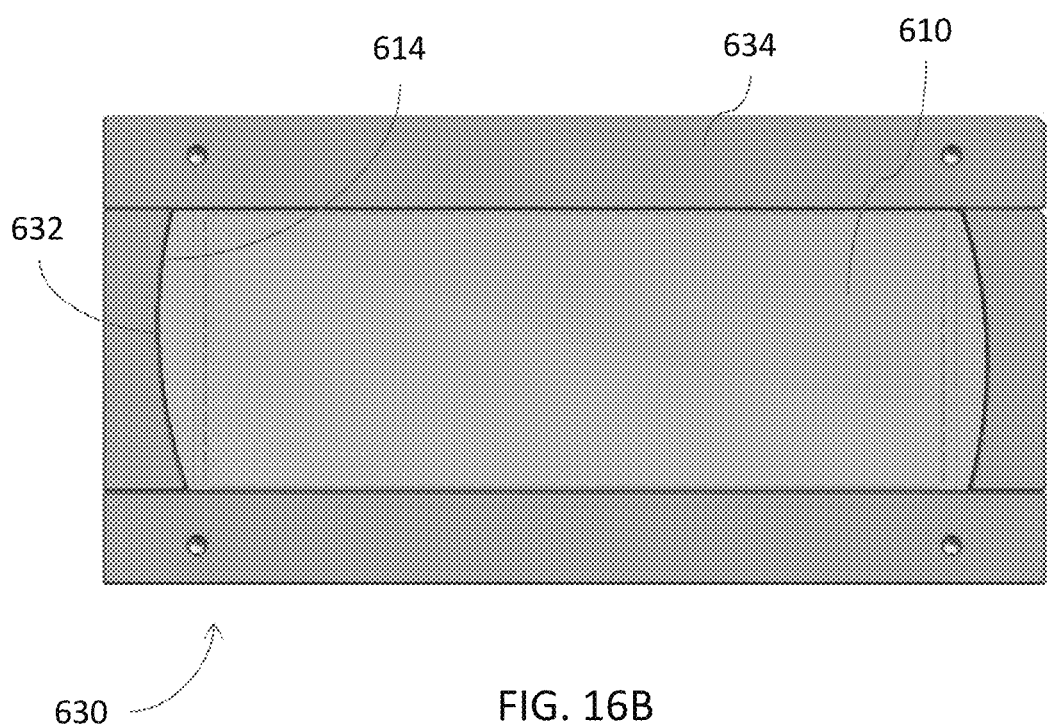
Figure 17:
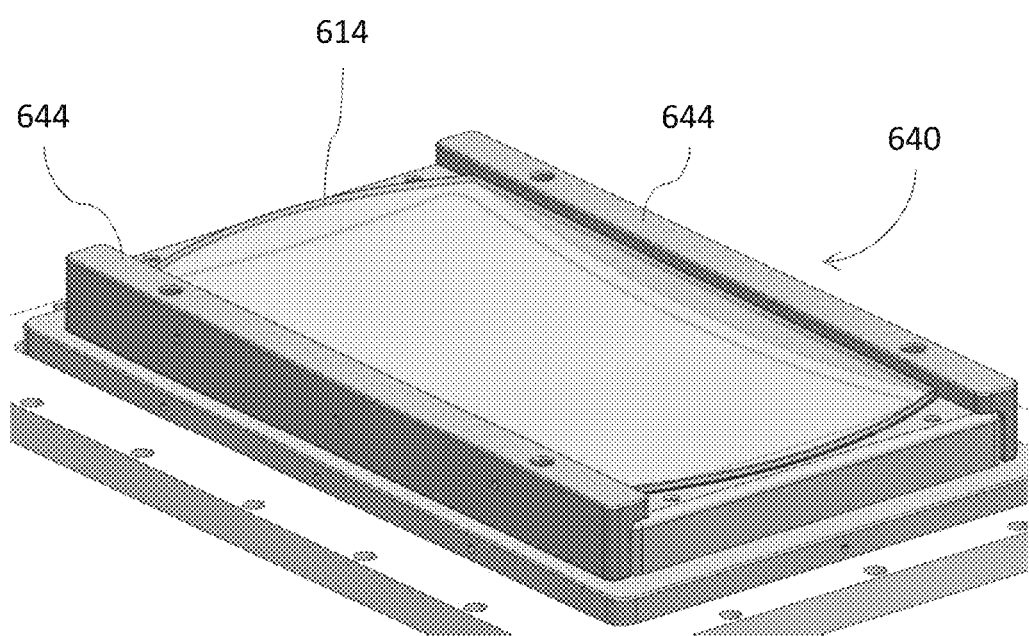
FIG. 17 is an isometric view of another housing used with a mirror preform having a curved end edge according to some embodiments.

FIGS. 16A and 16B are perspective and plan views, respectively, showing the preform 610 of FIGS. 15A and 15B with the curved short-side edge 614 being used with a modified housing 630, according to some embodiments. The modified housing 630 has long-side walls 634 and short-side walls 632, but the short-side walls 632 has curved inner surfaces to coincide with the curved short-side edge 614 of the preform 610. However, in some embodiments, the short-side walls 632 of the housing 630 may not be needed when used with preform 610, due to the improved vacuum suction and reduction in suction loss at the curved short-side edge 614 resulting from the curved edge. Thus, FIG. 17 shows another embodiment in which a housing 640 is provided with only long-side walls 644, and no wall coinciding with the curved short-side edge 614.

Figure 18:
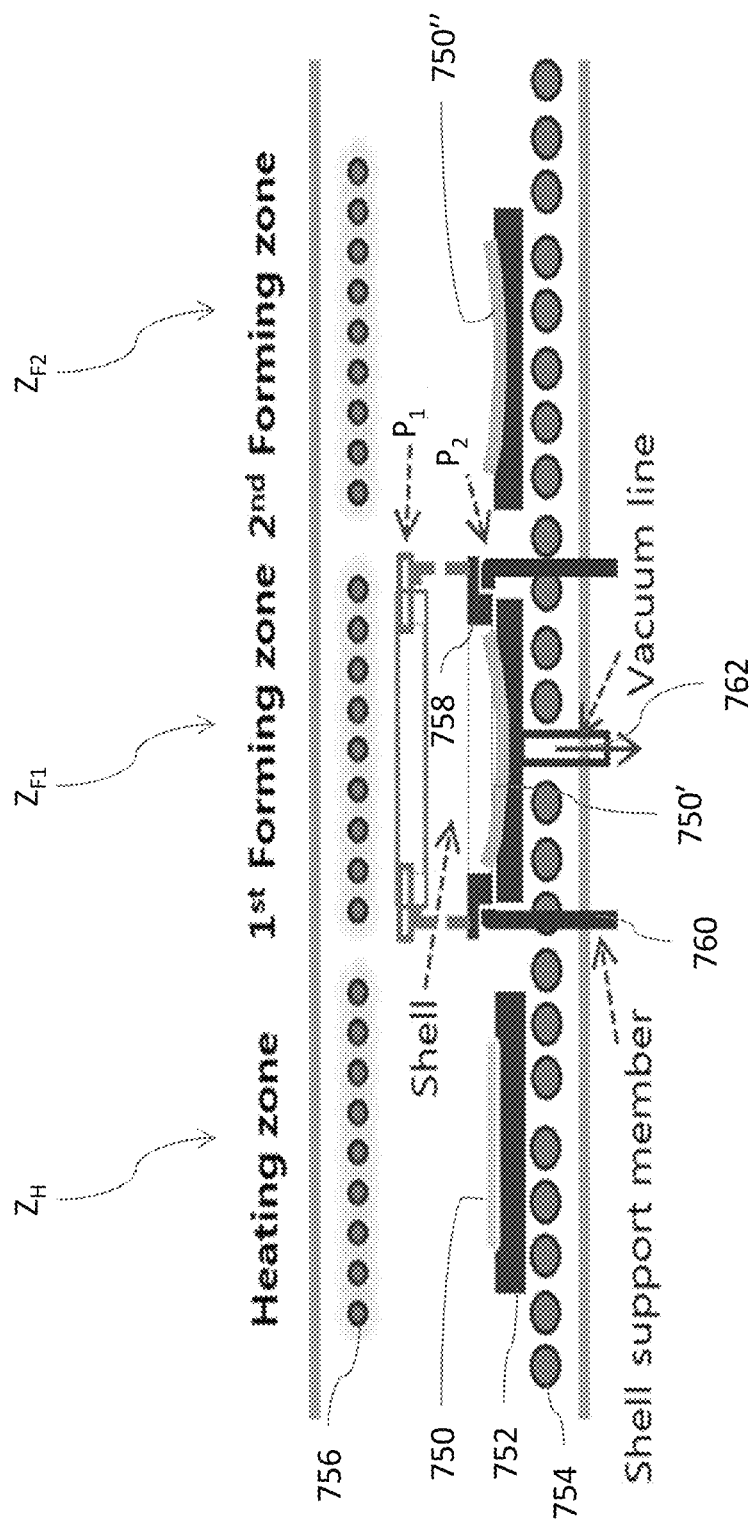
FIG. 18 is a cross-section view of a system and method for forming a curved mirror using a mirror preform and housing according to some embodiments.

FIG. 18 shows an example method of vacuum forming a 3D mirror from a 2D mirror preform using a housing for improved vacuum suction and reduced vacuum leakage. In FIG. 18, an assembly line includes zones for different steps of forming the 3D mirror. A 2D preform 750 is provided on a mold 752 having a curved forming surface (not shown). The mold 752 is moved along rollers or other suitable means of conveyance through various zones or steps in the forming process. In a heating zone ZH, one or more heaters 756 are provided to heat the preform 750. As discussed above, due to improvements in the embodiments of this disclosure, it is possible to perform the molding of the 2D preform at lower temperatures than conventional vacuum forming techniques. Although the temperature in the heating zone ZH is not particularly, limited, it can be low enough so that the preform 750 does not reach a glass transition temperature Tg of the preform 750. In some embodiments, the temperature can be less than or equal to Tg−10° C. In other embodiments, the temperature can be less than or equal to Tg−20° C., or from Tg−20° C. to Tg−10° C. The heaters 756 can be located above the preform 750 and mold 752 so that they are out of the way of the other forming equipment and can direct heat to the surface of the preform.

Next, a first forming zone ZF1 is provided in which a housing 758 is positioned to surround some or all of the edges of the preform 750 and vacuum pressure is supplied to the mold 752 to conform the preform to the forming surface of the mold 752, which turns the 2D preform 750 into a curved substrate 750'. This can be a primary forming step, which can be followed by additional forming steps, as discussed below. As discussed above, the housing 758 is provided for improved vacuum pressure, particularly around the edges of the preform 750 or curved substrate 750'. Methods can include provided the housing 758 by lowering it from a raised position P1 to a lower position P2. When lowered to P2, the housing 758 can be lowered onto a support surface 760 configured to hold and support the housing. During this step of vacuum forming, heat can continue to be supplied by heaters 756, but at a relatively low temperature due to the improved and even vacuum supplied with the help of the housing 758. Although not shown in FIG. 18, the preform 750 can be a preform having curved short-side edges for increase vacuum molding performance. In the second forming zone ZF2, vacuum pressure and/or heating can still be applied to the primary formed substrate 750" for additional and/or optional further steps.

Figure 19A:
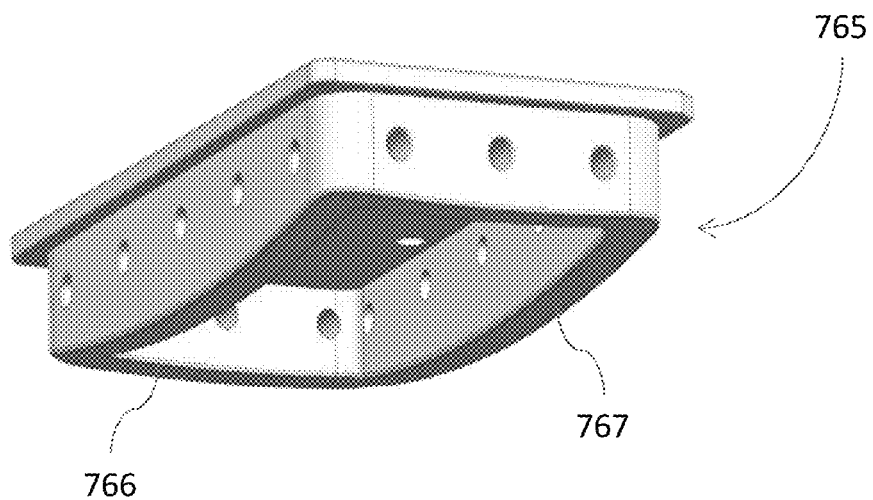
FIGS. 19A and 19B are isometric and cross-section views of a clamping-ring for forming a curved mirror according to some embodiments.
Figure 19B:
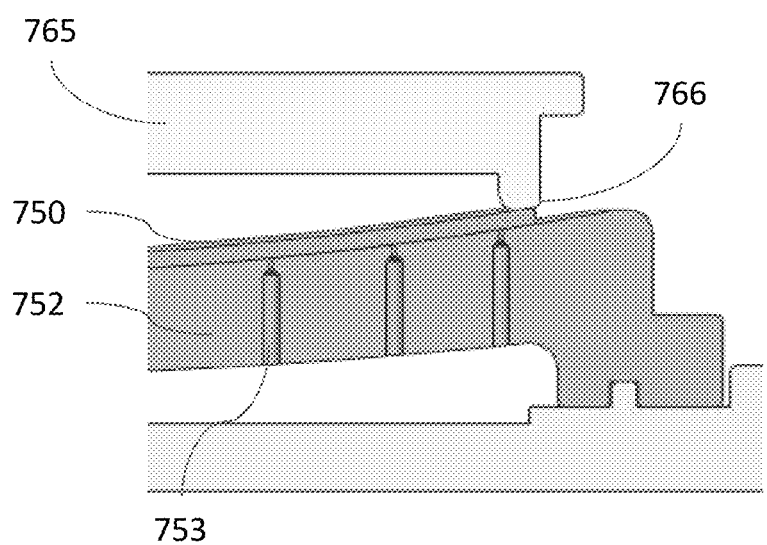

In some embodiments, additional steps in the above method include the use of a force applied at or near the of a mirror preform or primarily formed mirror for improved edge forming and shape. FIGS. 19A and 19B show a clamping ring 765 as one example embodiment for applying the edge form. As shown in FIG. 19A, the clamping ring 765 has short-side walls 766 and long-side walls 767 forming a ring-like shape with a space in the middle. The walls 766 and 767 have curved bottom surface that are designed to correspond to the curvatures along the edges of the desired 3D mirror or to the curvature of the forming surface of mold 752 directly below walls 766 and 767. Thus, as shown in FIG. 19B, the curved short-side edge 766 can apply a downward force on the edge of preform 750 during forming to achieve improved edge shape by conforming the edge to the forming surface and preventing vacuum leaks at the edge from vacuum holes 753. Although FIG. 19A shows a clamping ring 765 with four walls having curved bottom surfaces, it is contemplated that a clamping ring may be applied to only some or a portion of the edges of a preform.

Figure 20:
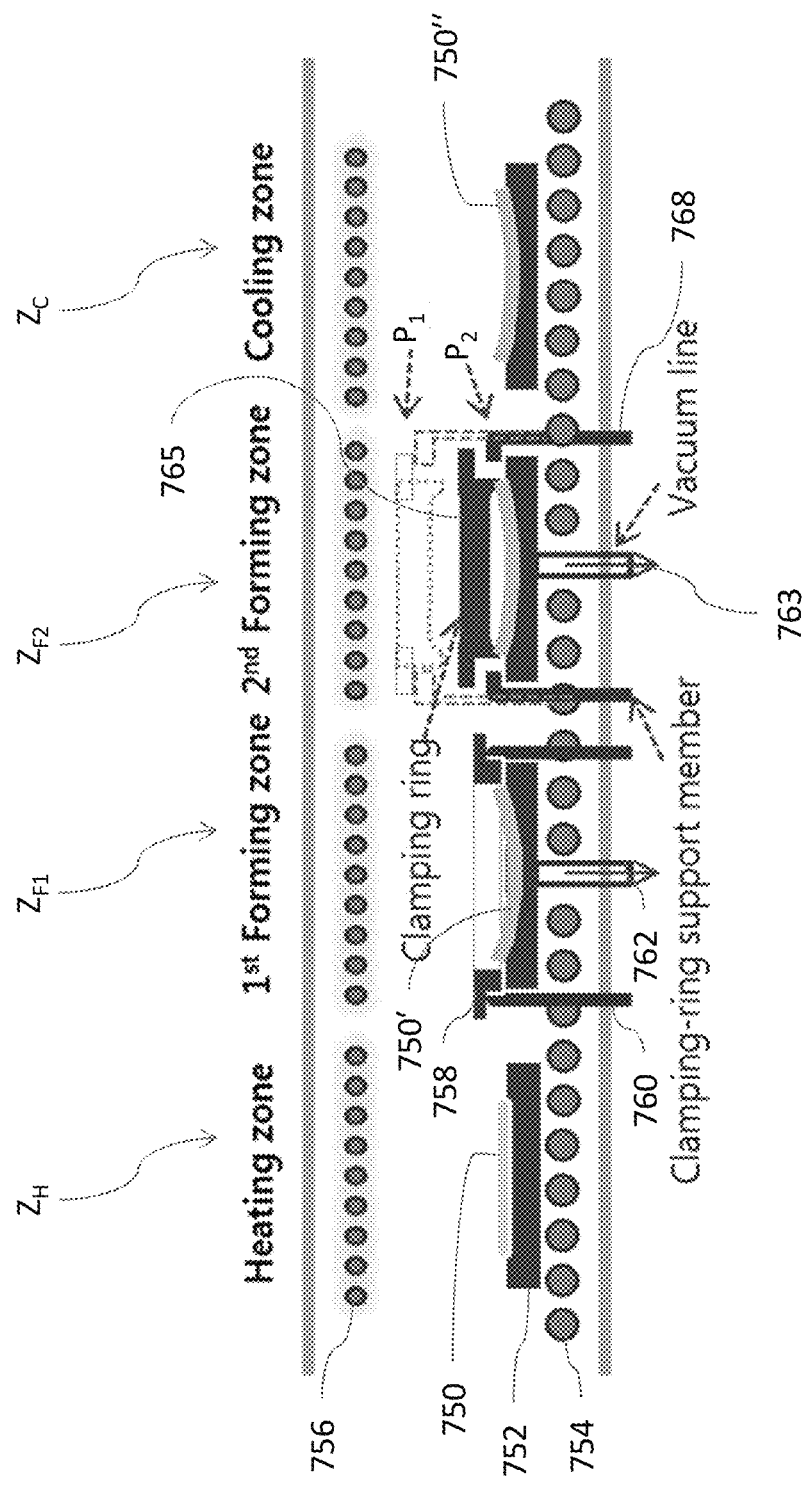
FIG. 20 is a cross-section view of a system and method for forming a curved mirror using a mirror preform and clamping-ring according to some embodiments.

FIG. 20 shows an alternative view of the method and assembly line shown in FIG. 18. In particular, the second forming zone ZF2 includes a clamping ring 765. The clamping ring 765 is lowered by a clamping-ring support member 768 from a position P1 above the preform 750' to a position P2 on the preform 750'. After the second forming zone ZF2, the preform 750" can move to a cooling zone ZC or cooling step.

Although FIGS. 18 and 20 illustrate methods on a linear assembly line, the steps or zones ZH, ZF1, ZF2, and ZC may or may not be performing in different physical locations. For example, the clamping ring and housing may be used without moving the preform from one location to another. Furthermore, the housing and clamping ring can be used simultaneously during forming. In addition, the illustration of the clamping ring 765 in FIGS. 19A and 19B is an example only. The mechanism for providing the force to conform the edges of a preform to a forming surface can take many forms.

Figure 21:
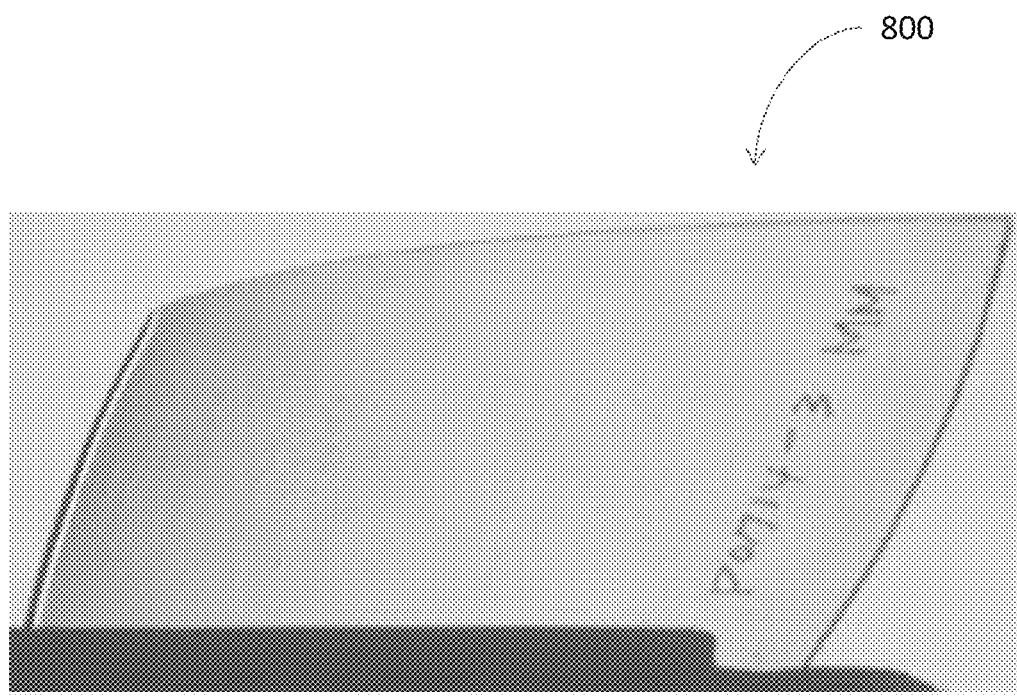
FIG. 21 is a photograph of an example curved mirror formed according to embodiments of the present disclosure.

FIG. 21 is a photograph of an example of a 3D mirror 800 formed using devices and methods discussed above, included a preform with a curved short-side edge.

Example

Using the above-described methods, as shown in FIGS. 18 and 20, for example, sample preforms were curved into 3D shapes. It was found that the systems and methods of this disclosure significantly lowered the forming temperature required compared to conventional preform-based vacuum forming methods, and excellent quality, as measured by surface roughness, was also achieved. In particular, using the conventional preform-based vacuum forming method, a forming temperature of around 800° C. was required when using a glass preform made of Gorilla Glass® with a thickness of 2.0 mm, and a surface roughness of less than 3.0 nm was achieved for the concave surface of the curved preform. In contrast, using the systems and methods discussed herein, the forming temperature was around 700° C. for a glass preform made of the same material and thickness, and the surface roughness was less than 1.5 nm.

In some embodiments of this disclosure, to conform a mirror preform to the forming surface, vacuum pressure is supplied through one or more vacuum holes, as discussed above. However, the vacuum holes can leave manufacturing artifacts in the form of imperfections where the substrate contracted the vacuum holes. Thus, mold may not include vacuum holes in an area that will contact the effective area of the mirror preform or 3D mirror. Instead, the mold can have one or more vacuum holes in an area of the mold that does not contact the effective area, such as at the perimeter of the forming surface adjacent to an area near the edge of the 3D mirror. In some embodiments, a ditch-type vacuum hole can be used at a periphery of the forming surface. As used herein, the effective area is a portion of the mirror or mirror substrate that will reflect the image to be projected and primarily viewed by the user.

The reflective surface can be formed via sputtering, evaporation (e.g., CVD, PVD), plating, or other methods of coating or supplying a reflective surface known to those of ordinary skill in the art. The reflective surface can include one or more metals, metallic/ceramic oxides, metallic/ceramic alloys, for example. The reflective coating can include aluminum or silver. The reflective surface is formed on the 3D formed substrate after forming the substrate to a curved or aspheric shape. However, embodiments are not limited to this order, and it is contemplated that a 3D mirror can be formed from a 2D preform having a reflective surface.

The glass-based substrate has a thickness that is less than or equal to 3.0 mm; from about 0.5 mm to about 3.0 mm; from about 0.5 mm to about 1.0 mm; or from about 1.0 mm to about 3.0 mm.

Suitable glass substrates for mirrors in HUD systems can be non-strengthened glass sheets or can also be strengthened glass sheets. The glass sheets (whether strengthened or non-strengthened) may include soda-lime glass, aluminosilicate, boroaluminosilicate or alkali aluminosilicate glass. Optionally, the glass sheets may be thermally strengthened. In embodiments where soda-lime glass is used as the non-strengthened glass sheet, conventional decorating materials and methods (e.g., glass frit enamels and screen printing) can be used Suitable glass substrates may be chemically strengthened by an ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass to balance the compressive stress.

Exemplary ion-exchangeable glasses that are suitable for forming glass substrates are soda lime glasses, alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One exemplary glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for forming glass substrates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further exemplary glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

wherein in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

The chemically-strengthened as well as the non-chemically-strengthened glass, in some embodiments, can be batched with 0-2 mol. % of at least one fining agent selected from a group that includes $Na_2SO_4$, NaCl, NaF, NaBr, $K_2SO_4$, KCl, KF, KBr, and $SnO_2$.

In one exemplary embodiment, sodium ions in the chemically-strengthened glass can be replaced by potassium ions from the molten bath, though other alkali metal ions having a larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, glass substrates comprising ion-exchanged glass can possess an array of desired properties, including low weight, high impact resistance, and improved sound attenuation. In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

A modulus of elasticity of a chemically-strengthened glass sheet can range from about 60 GPa to 85 GPa (e.g., 60, 65, 70, 75, 80 or 85 GPa). If used in a glass-based laminate with a polymer interlayer, the modulus of elasticity of the glass sheet(s) and the polymer interlayer can affect both the mechanical properties (e.g., deflection and strength) and the acoustic performance (e.g., transmission loss) of the resulting glass laminate structure.

Suitable glass substrates may be thermally strengthened by a thermal tempering process or an annealing process. The thickness of the thermally-strengthened glass sheets may be less than about 2 mm or less than about 1 mm.

Exemplary glass sheet forming methods include fusion draw and slot draw processes, which are each examples of a down-draw process, as well as float processes. These methods can be used to form both strengthened and non-strengthened glass sheets. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

In some embodiments, exemplary glass substrates of embodiments discussed herein can be employed in vehicles (automobile, aircraft, and the like) having a Head-up or Heads-up Display (HUD) system. The clarity of fusion formed according to some embodiments can be superior to glass formed by a float process to thereby provide a better driving experience as well as improve safety since information can be easier to read and less of a distraction. A non-limiting HUD system can include a projector unit, a combiner, and a video generation computer. The projection unit in an exemplary HUD can be, but is not limited to, an optical collimator having a convex lens or concave mirror with a display (e.g., optical waveguide, scanning lasers, LED, CRT, video imagery, or the like) at its focus. The projection unit can be employed to produce a desired image. In some embodiments, the HUD system can also include a combiner or beam splitter to redirect the projected image from the projection unit to vary or alter the field of view and the projected image. Some combiners can include special coatings to reflect monochromatic light projected thereon while allowing other wavelengths of light to pass through. In additional embodiments, the combiner can also be curved to refocus an image from the projection unit. Any exemplary HUD system can also include a processing system to provide an interface between the projection unit and applicable vehicle systems from which data can be received, manipulated, monitored and/or displayed. Some processing systems can also be utilized to generate the imagery and symbology to be displayed by the projection unit.

Using such an exemplary HUD system, a display of information (e.g., numbers, images, directions, wording, or otherwise) can be created by projecting an image from the HUD system onto an interior facing surface of a glass-based mirror substrate. The mirror can then redirect the image so that it is in the field of view of a driver.

Exemplary glass substrates according to some embodiments can thus provide a thin, pristine surface for the mirror. In some embodiments, fusion drawn Gorilla Glass can be used as the glass substrate. Such glass does not contain any float lines typical of conventional glass manufactured with the float process (e.g., soda lime glass).

HUDs according to embodiments of the present disclosure can be employed in automotive vehicles, aircraft, synthetic vision systems, and/or mask displays (e.g., head mounted displays such as goggles, masks, helmets, and the like) utilizing exemplary glass substrates described herein. Such HUD systems can project critical information (speed, fuel, temperature, turn signal, navigation, warning messages, etc.) in front of the driver through the glass laminate structure.

According to some embodiments, the HUD systems described herein can use nominal HUD system parameters for radius of curvature, refractive index, and angle of incidence (e.g., radius of curvature Rc=8301 mm, distance to source: Ri=1000 mm, refractive index n=1.52, and angle of incidence θ=62.08o).

Aspect 1 of this disclosure pertains to a method of forming a three-dimensional mirror for a heads-up display (HUD) system, the method comprising: providing a glass-based preform having a first major surface, a second major surface opposite to the first major surface, and a minor surface connecting the first and second major surfaces, the minor surface comprising first and second longitudinal side surfaces opposite to each other and first and second transverse side surfaces connecting the longitudinal side surfaces; disposing the glass-based preform on a mold having a concave surface such that the second major surface faces the concave surface of the mold, and such that the first and second longitudinal side surfaces are adjacent to a longitudinal wall of a housing, the longitudinal wall extending from the concave surface to at least a height of the second major surface of the glass-based preform; supplying a vacuum to a gap between the second major surface and the concave surface; and conforming the second major surface to the concave surface of the mold using the vacuum, wherein the first and second transverse side surfaces have a curved shape corresponding to a curve of the concave surface such that the first and second transverse side surfaces remain coincident with the concave surface during the conforming of the second major surface.

Aspect 2 of this disclosure pertains to the method of Aspect 1, wherein the concave surface comprises at least one opening for supplying a vacuum to the gap.

Aspect 3 of this disclosure pertains to the method of Aspect 1 or Aspect 2, wherein the longitudinal wall of the housing prevents leakage of the vacuum at a portion of the gap between the first longitudinal side surface and the concave surface, and between the second longitudinal side surface and the concave surface.

Aspect 4 of this disclosure pertains to the method of any one of Aspects 1-3, wherein the concave surface of the mold comprises a first radius of curvature for a first curvature running in a longitudinal direction of the mold, and a second radius of curvature for a second curvature running in a transverse direction of the mold, the second radius of curvature being larger than the first radius of curvature.

Aspect 5 of this disclosure pertains to the method of any one of Aspects 1-4, wherein the concave surface is shaped such that, during conforming, a distance between the first and second longitudinal side surfaces of the glass-based preform decreases less than a distance between the first and second transverse side surfaces of the glass-based preform.

Aspect 6 of this disclosure pertains to the method of any one of Aspects 1-5, wherein a transverse wall of the housing prevents leakage of the vacuum at a portion of the gap between the first transverse side surface and the concave surface, and between the second transverse side surface and the concave surface.

Aspect 7 of this disclosure pertains to the method of any one of Aspects 1-6, wherein clearance between the housing and the minor surface is less than about 0.5 mm.

Aspect 8 of this disclosure pertains to the method of any one of Aspects 1-7, wherein the curved shape of at least one of the first and second transverse side surfaces comprises a single radius of curvature.

Aspect 9 of this disclosure pertains to the method of any one of Aspects 1-8, wherein the curved shape of at least one of the first and second transverse side surfaces comprises a spline curve.

Aspect 10 of this disclosure pertains to the method of any one of Aspects 1-9, wherein the three-dimensional mirror is not cut after conforming the second major surface such that the three-dimensional mirror for the HUD system has a first major surface that is concavely shaped, a second major surface opposite to the first major surface, and a minor surface connecting the first and second major surfaces, the minor surface corresponding to the minor surface of the glass preform.

Aspect 22 of this disclosure pertains to the method of any one of Aspects 1-10, wherein at least a portion of the first major surface is a reflective surface.

Aspect 12 of this disclosure pertains to the method of Aspect 11, wherein the reflective surface comprises a metal, a metallic oxide, a ceramic oxide, or a metallic-ceramic oxide disposed on the first major surface.

Aspect 13 of this disclosure pertains to the method of Aspect 12, wherein the metallic layer comprises Al, Ag, TiO2, or SiO2.

Aspect 14 of this disclosure pertains to the method of any one of Aspects 1-13, wherein the conforming of the second major surface to the concave surface of the mold is performed at a temperature below the glass transition temperature of the glass-based substrate.

Aspect 15 of this disclosure pertains to the method of Aspect 14, wherein the temperature is about 5° C. to 30° C. below the glass transition temperature of the glass-based substrate.

Aspect 16 of this disclosure pertains to the method of Aspect 15, wherein the temperature is about 10° C. to 20° C. below the glass transition temperature of the glass-based substrate.

Aspect 17 of this disclosure pertains to the method of any one of Aspects 1-16, further comprising forming a reflective surface on the first major surface after the conforming of the second major surface to the concave surface.

Aspect 18 of this disclosure pertains to an apparatus for forming a three-dimensional mirror for a heads-up display (HUD), comprising: a mold comprising a concave surface with at least one opening configured to supply a vacuum to a space above the concave surface when a glass-based preform is disposed on the mold; and a housing adjacent to and at least partially surrounding the concave surface, the housing extending from the concave surface to at least a height of the glass-based preform when the mirror preform is disposed on the mold,
wherein the housing is sized to prevent leakage of the vacuum at a portion of the space between the glass-based preform and the concave surface.

Aspect 19 of this disclosure pertains to the apparatus of Aspect 18, wherein the housing comprises first and second longitudinal side walls along opposite longitudinal sides of the concave surface.

Aspect 20 of this disclosure pertains to the apparatus of Aspect 18 or Aspect 19, wherein the housing comprises first and second transverse side walls along opposite transverse sides of the concave surface, the first and second transverse side walls being curved to a shape corresponding to a curve of first and second edges of the glass-based preform.

Aspect 21 of this disclosure pertains to the apparatus of any one of Aspects 18-20, wherein the support surface has an aspheric shape configured to conform the glass-based preform to an aspheric shape.

Aspect 22 of this disclosure pertains to a method of forming an aspheric mirror from a two-dimensional glass-based preform, the method comprising: providing a glass-based preform comprising a first major surface, a second major surface opposite the first major surface, and a minor surface connecting the first and second major surfaces, the minor surface comprising first and second longitudinal side surfaces opposite to each other and first and second transverse side surfaces connecting the longitudinal side surfaces the glass-based preform having a substantially two-dimensional shape; disposing the glass-based preform on a lower mold comprising a curved surface having an aspheric shape facing the second major surface, the lower mold being configured to supply a vacuum to a gap between the curved surface and the second major surface; and performing a primary forming step by supplying vacuum pressure to the gap while a shell surrounds the glass-based preform such that a substantially vertical wall of the shell extends from the curved surface to at least the second major surface, the substantially vertical wall facing the minor surface; wherein the substantially vertical wall of the shell is spaced from the minor surface at a distance to improve the vacuum pressure in the gap.

Aspect 23 of this disclosure pertains to the method of Aspect 22, further comprising: performing a secondary forming step by applying a clamping-ring to a periphery portion of the first major surface to hold the second major surface against the curved surface at the periphery portion, wherein the second forming step is performed while the lower mold is supplying a vacuum to the gap.

Aspect 24 of this disclosure pertains to the method of Aspect 23, wherein the second forming step is performed after the first forming step.

Aspect 25 of this disclosure pertains to the method of any one of Aspects 22-24, wherein the first and second traverse side surfaces have a curved shape corresponding to a curvature of the curved surface of the lower mold, and wherein the curved shape of the first and second transverse side surfaces remains substantially coincident with the curved surface during the primary forming step.

Aspect 26 of this disclosure pertains to the method of any one of Aspects 22-25, further comprising placing the shell on a lower support member configured to lower the shell onto the lower mold for the primary forming step.

Aspect 27 of this disclosure pertains to the method of any one of Aspects 23-26, further comprising placing the clamping-ring on the glass-based preform using a lower support member configured to lower the clamping-ring onto the glass-based preform for the secondary forming step.

Aspect 28 of this disclosure pertains to the method of any one of Aspects 22-27, further comprising heating the glass-based preform during the primary forming step.

Aspect 29 of this disclosure pertains to the method of any one of Aspects 23-28, further comprising heating the glass-based preform during the primary and secondary forming steps.

Aspect 30 of this disclosure pertains to the method of Aspect 29, wherein a temperature of heating the glass-based preform during the secondary forming step is lower than a temperature of heating the glass-based preform during the primary forming step.

Aspect 31 of this disclosure pertains to the method of Aspect 28, wherein a heater is disposed above the lower mold facing the first major surface of the glass-based preform.

Aspect 32 of this disclosure pertains to the method of Aspect 30, wherein a heater is disposed above the lower mold facing the first major surface of the glass-based preform.

Aspect 33 of this disclosure pertains to the method of any one of Aspects 22-32, wherein the aspheric mirror is not cut after the primary forming step.

Aspect 34 of this disclosure pertains to the method of any one of Aspects 22-33, wherein the first major surface comprises a reflective surface.

Aspect 35 of this disclosure pertains to the method of Aspect 34, wherein the reflective surface comprises a metal, a metallic oxide, a ceramic oxide, or a metallic-ceramic oxide.

Aspect 36 of this disclosure pertains to the method of Aspect 35, wherein the metal is Al, Ag, $TiO_2$, or $SiO_2$.

Aspect 37 of this disclosure pertains to the method of any one of Aspects 22-36, wherein the distance that the substantially vertical wall of the shell is spaced from the minor surface is less than or equal to 1 mm.

Aspect 38 of this disclosure pertains to the method of any one of Aspects 22-37, wherein the distance that the substantially vertical wall of the shell is spaced from the minor surface is less than 1 mm.

Aspect 39 of this disclosure pertains to the method of any one of Aspects 30-38, wherein the temperature of heating the glass-based preform during the secondary forming step is less than the glass transition temperature of the glass-based preform.

Aspect 40 of this disclosure pertains to the method of Aspect 39, wherein the temperature of heating the glass-based preform during the secondary forming step is about 5° C.-20° C. below the glass transition temperature of the glass-based preform.

Aspect 41 of this disclosure pertains to the method of any one of Aspects 22-40, wherein the vacuum pressure is from 70 to 90 kPa.

Aspect 42 of this disclosure pertains to the method of any one of Aspects 23-41, wherein the clamping-ring comprises first and second curved surfaces corresponding to first and second portions of the curved surface of the lower mold, the first and second curved surface being shaped to hold the periphery portion in contact with the lower mold to improve the vacuum pressure.

Aspect 43 of this disclosure pertains to the method of any one of Aspects 22-42, wherein a length of the first and second longitudinal side surfaces is greater than a length of the first and second transverse side surfaces.

Aspect 44 of this disclosure pertains to the method of any one of Aspects 22-43, wherein the aspheric mirror is a mirror for a heads-up display (HUD).

Aspect 45 of this disclosure pertains to a glass-based three-dimensional (3D) mirror for a heads-up display (HUD) system formed according to any one of Aspects 1-17 and 22-44.

Aspect 46 of this disclosure pertains to the mirror of Aspect 45, wherein the glass-based preform has a thickness that is less than or equal to 3.0 mm.

Aspect 47 of this disclosure pertains to the mirror of Aspect 46, wherein the thickness of the glass-based preform is from about 0.5 mm to about 3.0 mm.

Aspect 48 of this disclosure pertains to the mirror of Aspect 47, wherein the thickness of the glass-based preform is from about 0.5 mm to about 1.0 mm.

Aspect 49 of this disclosure pertains to the mirror of Aspect 47, wherein the thickness of the glass-based preform is from about 1.0 mm to about 3.0 mm.

Aspect 50 of this disclosure pertains to the mirror of any one of Aspects 45-49, wherein the mirror has a first radius of curvature such that the first major surface has a concave shape and the second major surface has a convex shape, the first radius of curvature being relative to a first axis of curvature.

Aspect 51 of this disclosure pertains to the mirror of Aspect 50, wherein the mirror has a second radius of curvature that is relative to a second axis of curvature different from the first axis of curvature.

Aspect 52 of this disclosure pertains to the mirror of Aspect 51, wherein the first axis of curvature is perpendicular to the second axis of curvature.

Aspect 53 of this disclosure pertains to the mirror of any one of Aspects 45-51, wherein the first major surface has an aspheric shape.

Aspect 54 of this disclosure pertains to the mirror of any one of Aspects 45-53, wherein the glass-based preform comprises strengthened glass.

Aspect 55 of this disclosure pertains to the glass-based preform of Aspect 54, wherein the strengthened glass is chemically strengthened.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be initially claimed as such, one or more features from a claimed combination may in some cases be excised from the combination, and the claimed combination may be directed to a sub-combination or variation of a sub-combination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

As shown by the various configurations and embodiments illustrated in the figures, various glass-based structures for head-up displays have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

The invention claimed is:

1. A method of forming a three-dimensional mirror for a heads-up display (HUD) system, the method comprising:
   providing a glass-based preform having a first major surface, a second major surface opposite to the first major surface, and a minor surface connecting the first and second major surfaces, the minor surface comprising first and second longitudinal side surfaces opposite to each other and first and second transverse side surfaces connecting the longitudinal side surfaces;
   disposing the glass-based preform on a mold having a concave surface such that the second major surface faces the concave surface of the mold, and such that the first and second longitudinal side surfaces are adjacent to a longitudinal wall of a housing, the longitudinal wall extending from the concave surface to at least a height of the second major surface of the glass-based preform, wherein the concave surface comprises at least one opening for supplying a vacuum to a gap between the second major surface and the concave surface;
   supplying a vacuum to the gap; and
   conforming the second major surface to the concave surface of the mold using the vacuum, wherein the at least one opening for supplying the vacuum to the gap does not contact an effective area of the three-dimensional mirror,
   wherein the first and second transverse side surfaces have a curved shape corresponding to a curve of the concave surface such that the first and second transverse side surfaces contact the concave surface when the glass-based preform is disposed on the mold in a two-dimensional shape and remain coincident with the concave surface during the conforming of the second major surface,
   wherein the glass-based preform is not cut after the conforming.

2. A method of forming an aspheric mirror from a two-dimensional glass-based preform, the method comprising:
   providing a glass-based preform comprising a first major surface, a second major surface opposite the first major surface, and a minor surface connecting the first and second major surfaces, the minor surface comprising first and second longitudinal side surfaces opposite to each other and first and second transverse side surfaces connecting the longitudinal side surfaces;
   disposing the glass-based preform on a lower mold comprising a curved surface having an aspheric shape facing the second major surface when the glass-based preform has a two-dimensional shape, the lower mold being configured to supply a vacuum to a gap between the curved surface and the second major surface via one or more openings on the curved surface; and performing a primary forming step by supplying a vacuum pressure to the gap while a shell surrounds the glass-based preform such that a wall of the shell extends from the curved surface to at least the second major surface when the glass-based preform has the two-dimensional shape, the wall facing the minor surface;

wherein the one or more openings for supplying the vacuum to the gap does not contact an effective area of the aspheric mirror, and wherein the wall of the shell is spaced from the minor surface by a distance that is less than 0.5 mm.

3. The method of claim 2, further comprising:

performing a secondary forming step by applying a clamping-ring to a periphery portion of the first major surface to hold the second major surface against the curved surface at the periphery portion, wherein the secondary forming step is performed while the lower mold is supplying the vacuum pressure to the gap.

4. The method of claim 3, wherein the second forming step is performed after the primary forming step.

5. The method of claim 2, wherein the first and second traverse side surfaces have a curved shape corresponding to a curvature of the curved surface of the lower mold, and wherein the curved shape of the first and second transverse side surfaces remains coincident with the curved surface during the primary forming step.

6. The method of claim 2, further comprising placing the shell on a lower support member configured to lower the shell onto the lower mold for the primary forming step.

7. The method of claim 3, further comprising placing the clamping-ring on the glass-based preform using a lower support member configured to lower the clamping-ring onto the glass-based preform for the secondary forming step.

8. The method of claim 3, further comprising heating the glass-based preform during the primary and secondary forming steps.

9. The method of claim 2, wherein the aspheric mirror is not cut after the primary forming step.

10. The method of claim 2, further comprising forming a reflective surface on the first major surface.

11. The method of claim 10, wherein the reflective surface comprises a metal, a metallic oxide, a ceramic oxide, or a metallic-ceramic oxide.

12. The method of claim 2, wherein the distance that the wall of the shell is spaced from the minor surface is less than or equal to 1 mm.

13. The method of claim 2, wherein the vacuum pressure is from 70 to 90 kPa.

14. The method of claim 3, wherein the clamping-ring comprises first and second curved surfaces corresponding to first and second portions of the curved surface of the lower mold, the first and second curved surface being shaped to hold the periphery portion in contact with the lower mold to improve the vacuum pressure.

15. The method of claim 2, wherein a length of the first and second longitudinal side surfaces is greater than a length of the first and second transverse side surfaces.

16. A glass-based three-dimensional (3D) mirror for a heads-up display (HUD) system formed according to claim 2.

* * * * *

UNITED STATES PATENT AND TRADEMARK OFFICE
CERTIFICATE OF CORRECTION

| | | |
|---|---|---|
| PATENT NO. | : 11,767,250 B2 | Page 1 of 1 |
| APPLICATION NO. | : 16/768378 | |
| DATED | : September 26, 2023 | |
| INVENTOR(S) | : Kyubong Chae et al. | |

It is certified that error appears in the above-identified patent and that said Letters Patent is hereby corrected as shown below:

On the Title Page

On the page 6, in Column 1, under Item (56) "Other Publications", Line 29, delete "Internaitonal" and insert -- International --.

On the page 6, in Column 1, under Item (56) "Other Publications", Line 34, delete "FAADE" and insert -- FACADE --.

On the page 6, in Column 1, under Item (56) "Other Publications", Line 35, delete "FAADE"," and insert -- FACADE", --.

On the page 6, in Column 2, under Item (56) "Other Publications", Line 20, delete "atglasstec," and insert -- at glasstec, --.

On the page 6, in Column 2, under Item (56) "Other Publications", Line 57, delete "Pegaton" and insert -- "Pegatron --.

In the Specification

In Column 1, Line 12, delete "entirety" and insert -- entirety. --.

Signed and Sealed this
Thirteenth Day of February, 2024

Katherine Kelly Vidal
*Director of the United States Patent and Trademark Office*